US010679188B2

(12) United States Patent
Borje et al.

(10) Patent No.: US 10,679,188 B2
(45) Date of Patent: Jun. 9, 2020

(54) RANKING JOB CANDIDATE SEARCH RESULTS

(71) Applicant: Microsoft Technology Licensing, LLC, Redmond, WA (US)

(72) Inventors: Gio Borje, Sunnyvale, CA (US); Benjamin John McCann, Mountain View, CA (US); David DiCato, San Francisco, CA (US); Jerry Lin, San Jose, CA (US); Skylar Payne, Sunnyvale, CA (US); Apoorv Khandelwal, Santa Clara, CA (US); Nadeem Anjum, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 15/827,337

(22) Filed: Nov. 30, 2017

(65) Prior Publication Data

US 2019/0164132 A1    May 30, 2019

(51) Int. Cl.
*G06Q 10/10* (2012.01)
*G06Q 10/06* (2012.01)
*G06N 20/00* (2019.01)

(52) U.S. Cl.
CPC . *G06Q 10/1053* (2013.01); *G06Q 10/063112* (2013.01)

(58) Field of Classification Search
CPC combination set(s) only.
See application file for complete search history.

(56) References Cited

U.S. PATENT DOCUMENTS

| 7,120,658 | B2 | 10/2006 | Nash |
| 10,521,489 | B2 | 12/2019 | Borje et al. |
| 2005/0080657 | A1 | 4/2005 | Crow et al. |
| 2005/0246299 | A1 | 11/2005 | Scarborough et al. |
| 2006/0235884 | A1 | 10/2006 | Pfenninger et al. |
| 2006/0242561 | A1 | 10/2006 | Wang et al. |

(Continued)

OTHER PUBLICATIONS

Zhang et al. BMC Bioinformatics 2019, "How to balance the bioinformatics data: pseudo-negative sampling"; 20(Suppl 25):695 https://doi.org/10.1186/s12859-019-3269-4.*

(Continued)

*Primary Examiner* — Mark A Fleischer
(74) *Attorney, Agent, or Firm* — Schwegman Lundberg & Woessner, P.A.

(57) ABSTRACT

Systems and methods for predicting feature values in a matrix are disclosed. In example embodiments, a server accesses a matrix, the matrix having multiple dimensions, one dimension of the matrix representing features, and one dimension of the matrix representing entities. The server separates the matrix into multiple submatrices along a first dimension, each submatrix including all cells in the matrix for a set of values in the first dimension. The server provides the multiple submatrices to multiple machines. The server computes, using each machine, a correlation between values in at least one second dimension of the matrix and a value for a preselected feature in the matrix, the correlation being used to predict the value for the preselected feature based on other values along the at least one second dimension. The server provides an output representing the computed correlation.

20 Claims, 12 Drawing Sheets

(56) References Cited

U.S. PATENT DOCUMENTS

| | | | |
|---|---|---|---|
| 2014/0122355 A1* | 5/2014 | Hardtke | G06Q 10/105 |
| | | | 705/321 |
| 2015/0112881 A1 | 4/2015 | Modugu | |
| 2015/0120758 A1 | 4/2015 | Cichosz et al. | |
| 2015/0199646 A1 | 7/2015 | Taylor et al. | |
| 2016/0171444 A1 | 6/2016 | Mathers et al. | |
| 2018/0189667 A1* | 7/2018 | Tsou | G06N 5/003 |
| 2018/0218256 A1* | 8/2018 | Raviv | G06N 3/088 |
| 2019/0114593 A1* | 4/2019 | Champaneria | G06Q 10/1053 |
| 2019/0130221 A1* | 5/2019 | Bose | G06K 9/6257 |
| 2019/0163668 A1 | 5/2019 | Borje et al. | |
| 2019/0163718 A1 | 5/2019 | Borje et al. | |
| 2019/0164096 A1 | 5/2019 | Borje et al. | |
| 2019/0205838 A1 | 7/2019 | Fang et al. | |
| 2019/0235988 A1 | 8/2019 | Janjua et al. | |
| 2019/0303877 A1 | 10/2019 | Mccann et al. | |

OTHER PUBLICATIONS

Chawla, et al. "SMOTE: Synthetic Minority Over-sampling Technique", in Journal of Artificial Intelligence Research 16 (2002) 357. 321-357.*

"U.S. Appl. No. 15/941,501 Preliminary Amendment filed Apr. 16, 2018", 3 pgs.

"Non Final Office Action Issued in U.S. Appl. No. 15/827,350", dated Mar. 28, 2019, 11 Pages.

"Notice of Allowance Issued in U.S. Appl. No. 15/827,350", dated Sep. 5, 2019, 7 Pages.

"Non Final Office Action Issued in U.S. Appl. No. 15/941,501", dated Feb. 3, 2020, 20 Pages.

* cited by examiner

1100

Real World Data

|  | Past Employers | | | | | | | |
|---|---|---|---|---|---|---|---|---|
|  | A Corp. | B Corp. | C Corp. | D Corp. | E Corp. | F Corp. | G Corp. | H Corp. |
| Albert | 1/7 |  | 2/7 |  | 4/7 |  |  |  |
| Betsy |  | 1/3 |  | 2/3 |  |  |  |  |
| Carlos |  | 1/7 | 2/7 | 4/7 |  |  |  |  |
| Diana | 1/3 |  |  |  | 2/3 |  |  |  |

|  | Current Employer | | | | | | | |
|---|---|---|---|---|---|---|---|---|
|  | A Corp. | B Corp. | C Corp. | D Corp. | E Corp. | F Corp. | G Corp. | H Corp. |
| Albert |  |  |  | 1 |  |  |  |  |
| Betsy |  |  |  |  |  | 1 |  |  |
| Carlos |  |  |  |  |  |  | 1 |  |
| Diana |  |  |  |  |  |  |  | 1 |

Fictitious Negatively Sampled Data

|  | Past Employers | | | | | | | |
|---|---|---|---|---|---|---|---|---|
|  | A Corp. | B Corp. | C Corp. | D Corp. | E Corp. | F Corp. | G Corp. | H Corp. |
| Fictitious Albert | 1/7 |  | 2/7 |  | 4/7 |  |  |  |
| Fictitious Betsy |  | 1/3 |  | 2/3 |  |  |  |  |
| Fictitious Carlos |  | 1/7 | 2/7 | 4/7 |  |  |  |  |
| Fictitious Diana | 1/3 |  |  |  | 2/3 |  |  |  |

|  | Current Employer | | | | | | | |
|---|---|---|---|---|---|---|---|---|
|  | A Corp. | B Corp. | C Corp. | D Corp. | E Corp. | F Corp. | G Corp. | H Corp. |
| Fictitious Albert |  |  |  |  |  |  | 1 |  |
| Fictitious Betsy |  |  |  |  |  |  |  | 1 |
| Fictitious Carlos |  |  |  |  |  | 1 |  |  |
| Fictitious Diana |  |  |  | 1 |  |  |  |  |

FIG. 11

RANKING JOB CANDIDATE SEARCH RESULTS

TECHNICAL FIELD

The present disclosure generally relates to machines configured for learning to predict numerical outcomes in a matrix-defined problem space, including computerized variants of such special-purpose machines and improvements to such variants, and to the technologies by which such special-purpose machines become improved compared to other special-purpose machines that predict numerical outcomes. In particular, the present disclosure addresses systems and methods for implementing machine learning to predict numerical outcomes in a matrix-defined problem space.

BACKGROUND

Predicting numerical outcomes in a matrix-defined problem space may be desirable. For example, a matrix may store a set of past employers for multiple employees. It may be desirable to use this matrix to predict a future employer of one or more of the employees.

BRIEF DESCRIPTION OF THE DRAWINGS

Some embodiments of the technology are illustrated, by way of example and not limitation, in the figures of the accompanying drawings.

FIG. 11 is schematic diagram of matrices that may be used in negative sampling, in accordance with some embodiments.

DETAILED DESCRIPTION

Overview

Figure 1:
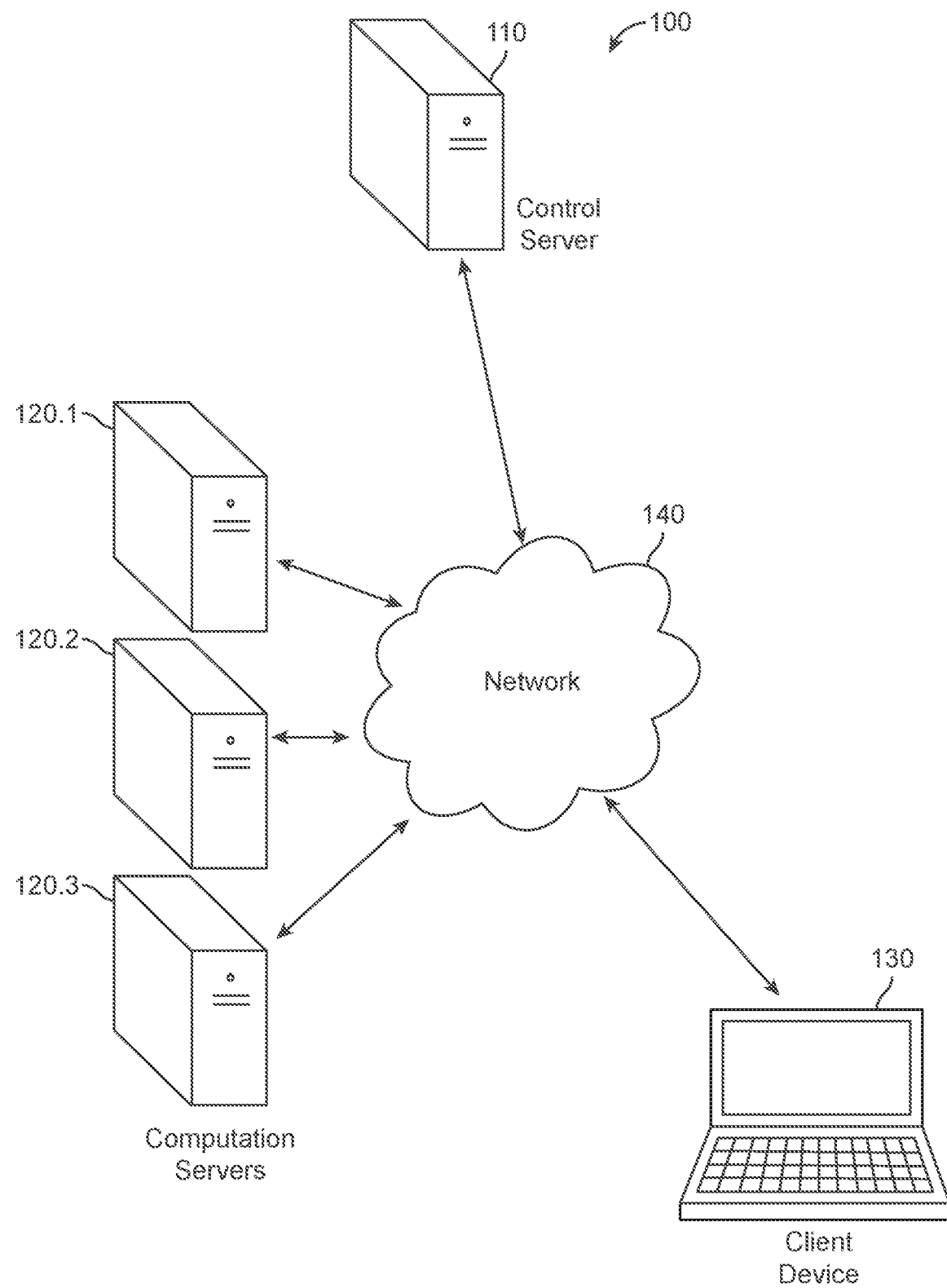
FIG. 1 illustrates an example system for predicting numerical outcomes in a matrix-defined problem space, in accordance with some embodiments.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It is evident, however, to one skilled in the art, that the present disclosure may be practiced without all of the specific details.

Some aspects of the technology described herein relate to predicting numerical outcomes in a matrix-defined problem space. Numerical outcomes may include any outcomes that may be expressed numerically, such as Boolean outcomes, integer outcomes or any other outcomes that are capable of being expressed with number(s). In some implementations, a control server accesses a matrix of examples, the matrix having multiple dimensions, one dimension of the matrix representing features, and one dimension of the matrix representing data points, which may correspond to any examples. In one innovative example, the data points correspond to examples of employees having the features of past or present employers. The control server separates the matrix into multiple submatrices along a first dimension, each submatrix including all cells in the matrix for a set of values in the first dimension. The control server provides the multiple submatrices to multiple computation servers, each computation server being provided with a single submatrix. Each computation server computes a correlation between values in at least one second dimension of the matrix and a value for a preselected feature in the matrix. The correlation is used to predict the value for the preselected feature based on other values along the at least one second dimension. Each computation server provides an output representing the computed correlation.

Factorization machines (FMs) and their extension, field-aware factorization machines (FFMs), have a broad range of applications for machine learning tasks including regression, classification, collaborative filtering, search ranking, and recommendation. In this document, a scalable implementation of the FFM learning model that runs on a standard Spark/Hadoop cluster is presented, among other things. One contribution, among others, includes a prediction algorithm that runs in linear time for models with higher order interactions of rank three or greater. Some aspects further describe the basic components of the FFM, including feature engineering and negative sampling, sparse matrix transposition, a training data and model co-partitioning strategy, and a computational graph-inspired training algorithm.

One distributed training algorithm and system optimizations enable some aspects to train FFM models at high speed and scale on commodity hardware using off-the-shelf big data processing frameworks such as Hadoop and Spark.

Some aspects solve the problem of correlating values in matrices. For example, information about a user of a professional network may be stored in a matrix, which may be used to recommend next professional moves (e.g. a new job) for the user. This problem is solved at a server. The server accesses a matrix, the matrix having multiple dimensions, one dimension of the matrix representing features, and one dimension of the matrix representing data points. The server separates the matrix into multiple submatrices along a first dimension, each submatrix including all cells in the matrix for a set of values in the first dimension. The server provides the multiple submatrices to multiple machines. The server computes, using each machine, a correlation between values in at least one second dimension of the matrix and a value for a preselected feature in the matrix, the correlation being used to predict the value for the preselected feature based on other values along the at least one second dimension. Some advantages and improvements include more efficient distributed (among multiple machines) computation of correlation of values in matrices. By distributing the submatrices among multiple machines and having each machine generate its own correlation, some aspects improve (e.g. increase) the speed at which the server is able to generate the output. The server would generate the output much more slowly if the server were to process the entire matrix without the assistance of the machines.

Some aspects solve the problem of correlating values in matrices. For example, information about a user of a professional network may be stored in a matrix, Which may be used to recommend next professional moves (e.g. a new job) for the user. This problem is solved at a control server. The control server accesses a matrix. The matrix has feature columns and example rows. The control server shards the matrix by features and by examples to generate feature shards and example shards, respectively. The control server distributes the feature shards and the example shards among a plurality of computation servers, each computation server from the plurality including an inner component storing at least one feature shard and an outer component storing at least one example shard. The control server receives a first correlation correlating data in an inner component of at least a first computation server with data in the outer components of the plurality of computation servers, the first correlation generated by running an inner pass. The control server receives a second correlation condoling data in an outer component of at least a second computation server with data in the inner components of the plurality of computation servers, the second correlation generated by running an outer pass. The control server stores the first correlation and the second correlation at the control server. The control server provides an output associated with at least the first correlation and the second correlation. Some advantages and improvements include more efficient distributed (among multiple computation servers and the control server) computation of correlation of values in matrices. By distributing the submatrices among multiple computation servers and having each computation server generate its own correlation, some aspects improve (e.g. increase) the speed at which the control server is able to generate the output. The control server would generate the output much more slowly if the control server were to process the entire matrix without the assistance of the computation servers.

Some aspects solve the problem of ranking job candidates when multiple candidates are available for an opening at a business. A server receives, from a client device, a request for job candidates for an employment position, the request comprising search criteria. The server generates, based on the request, a set of job candidates for the employment position. The server provides, to the client device, a prompt for ranking the set of job candidates. The server receives, from the client device, a response to the prompt. The server ranks the set of job candidates based on the received response. The server provides, for display at the client device, an output based on the ranked set of job candidates. Some advantages and improvements include the ability to rank job candidates based on feedback from the client device and the provision of prompts for this feedback.

In machine learning based on real-world information, there are many positive examples, but few negative examples. For example, a professional network may store information about candidates who recently received jobs at Company X, but may not store information about candidates who were rejected by Company X. Some aspects solve the problem of generating negative examples (e.g. generating examples of people who are not good fits for Company X). One solution assumes that, while the people who got jobs at Company are good fits, most other people are not good fits (as good fits for Company X are rare among the users of the professional network). A server accesses a matrix representing users of the professional network. The matrix has rows representing entities (e.g. people) and columns representing features (e.g. works at Company X). The server selects a specific column in the matrix for randomization. The server partitions the matrix by row into multiple submatrices. The server assigns the multiple submatrices to multiple machines, each submatrix being assigned to one machine and each machine being assigned to one submatrix. The server receives, from each machine, a shuffled submatrix generated at the machine by shuffling the values in the specific column among the rows of the submatrix assigned to the machine. The server merges the shuffled submatrices into a shuffled matrix. The server provides an output representing the shuffled matrix. Some advantages and improvements include the ability to generate negative samples using the matrix.

FIG. 1 illustrates an example system 100 for predicting numerical outcomes in a matrix-defined problem space, in accordance with some embodiments. As shown, the system includes a control server 110, computation servers 120, and a client device 130 connected to one another via a network 140. While a single control server 110 and a single client device 130 are illustrated, the technology may be implemented with multiple control servers or multiple client devices. Also, while three computation servers 120 are illustrated, there may be any number of computation servers 120. The network 140 may include one or more networks, such as the Internet, an intranet, a local area network, a wide area network, a wired network, a wireless network, a virtual private network, and the like. The client device 130 may include a laptop computer, a desktop computer, a mobile phone, a tablet, a smart watch, a smart television, a personal digital assistant, a digital music player, and the like.

According to some examples, the control server 110 stores (or is coupled with a data repository that stores) a matrix. The matrix has multiple dimensions. One of the dimensions represents features, such as employers, job titles, universities attended, and the like. One of the dimensions represents entities, such as individuals or employees. The control server 110 separates the matrix into multiple submatrices along a first dimension (e.g. features). Each submatrix includes all cells in the matrix for a set of values in the first dimension (e.g., all values for the employer "ABS Corporation"). The control server 110 provides the multiple submatrices to multiple computation servers 120.1-3. Each computation server 120.$k$ (where k is a number between 1 and 3) is provided with a single submatrix. It should be noted that, while three computation servers 120 are illustrated, there may be any number of computation servers 120. Some implementations may use hundreds or thousands of computation servers 120.

Each computation server 120.$k$ computes a correlation between values in at least one second dimension of the matrix and a value for a preselected feature in the matrix. The correlation is used to predict the value for the preselected feature based on other values along the at least one second dimension. The computation servers 120 provide an output representing the computed correlation. The merged output may be used to make predictions, and representations of the predictions may be provided for display at the client device 130.

In some cases, the preselected feature may be "employment at DEF Insurance Company." The computation server 120 may determine that features such as studying sales and marketing in college, having a Bachelor's degree, having worked at "GHI Insurance Company" or having worked at "JKL Insurance Company" are highly positively correlated with the feature of "employment at DEF Insurance Company." Other features, such as having worked at "MNO Technologies," might not be correlated or might be negatively correlated with "employment at DEF insurance Company."

Factorization machines (FMs) model all interactions between features using factorized parameters. Field-aware factorization machines (FFMs) are a subset of factorization machines that are used, for example, in recommender systems. FMs and FFMS may be used in machine learning tasks, such as regression, classification, collaborative filtering, search ranking, and recommendation. Some implementations of the technology described herein leverage FFMs to provide a prediction algorithm that runs in linear time. The training algorithm and system optimizations described herein enable training of the FFM models at high speed and at a large scale. Thus, FFMs based on large datasets and large parameter spaces may be trained.

In some embodiments, FMs are a model class that combines the advantages of Support Vector Machines (SVMs) with factorization models. Like SVMs, FMs are a general predictor working with any real valued feature vector. In contrast to SVMs, FMs model all interactions between features using factorized parameters. Thus they are able to estimate interactions even in problems with huge sparsity (like recommender systems) where SVMs fail. FMs are class of models which generalize Tensor Factorization models and polynomial kernel regression models. FMs uniquely combine the generality and expressive power of prior approaches (e.g., SVMs) with the ability to learn from sparse datasets using factorization (e.g., SVD++). FFMs extend FMs to also model effects of different interaction types, defined by fields.

For a large professional networking or employee-finding service, a production-level machine learning system may have a number of operational goals, such as scale. Large-scale distributed systems are needed to adequately process data of millions of professional network members.

The FFM model extends the FM model with information about groups (called fields) of features. The FFM model equation is shown in Equation 1. In Equation 1, y represents the FFM value, x is the feature vector, $w_0$ is the global bias, w is the unary bias, and V is the tensor of interaction vectors. The collection of $w_0$, w, and V are the parameters of the model. In Equation 1, $x \in R^m$, $w_0 \in R$, and $V \in R^{rsm}$.

$$\hat{y}(x; w_0, w, V) = w_0 + \sum_{j=1}^{m} \langle w, x \rangle + \sum_{j=1}^{m} \sum_{k>j}^{m} x_j x_k \langle V_{a(k)j}, V_{a(j)k} \rangle \qquad \text{Equation 1}$$

In some cases, the block synchronous parallel (BSP) model of computation is used for distributed computations (e.g., at the computation servers 120). The BSP model may include the following components: a set of processors $b_1, \ldots, b_n$, each with local memory (e.g., computation servers 120); a network that connects each processor to each other processor (e.g., network 140), and a synchronization device that synchronizes the processors (e.g., control server 110). To distribute object among the processors (e.g., computation servers 120), sharding schemes may used. A sharding scheme partitions data for distribution. In one specific, example, the shoaling scheme identifies feature partitions and assigns them to a computation server 120.k. Each distributed object may have at least one sharding scheme. For example, given w in $R^m$, a sharding scheme h would allocate $w_i$ in $b_{h(i)}$ for i between 1 and m. Some partitioning schemes may uniformly distribute data among processors. Two distributed objects are said to be co-partitioned with respect to h if they are both sharded by h.

In some examples, a dataset D may be used, where D includes a series of examples $x_i$ and labels $y_i$: $D=\{(x_i,y_i)\}_{i=1}^n$, where $x_i \in R^m$ and $y_i \in R$. In one implementation, there are n examples in the dataset, which are indexed $1 \le i \le n$. In one implementation, each example has m features, which are indexed using $1 \le j \le m$. For each feature, there are r associated latent factors, which are indexed using $1 \le f \le r$. Each feature belongs to exactly one field according to a field index mapping function: a: $\{1, \ldots, m\} \to \{1, \ldots, s\}$. There are s distinct fields indexed by p and q. This mapping a defines a disjoint union of nonempty fields $F_p \subseteq \{1, \ldots, m\}$ for each $1 \le p \le s$. Some aspects further define $m_p = |F_p|$ as the cardinality of field p, which leads to Equation 2.

$$m = \sum_{p=1}^{s} m_p \qquad \text{Equation 2}$$

Equation 1 may be rewritten as Equation 3, where Equation 4, Equation 5, and Equation 6 apply.

$$\hat{y}(x_i) = \hat{y}_{bias}(x_i) + \hat{y}_{inter}(x_i) + \hat{y}_{intra}(x_i) \qquad \text{Equation 3}$$

$$\hat{y}_{bias}(x_i) = w_0 + \langle w, x_i \rangle \qquad \text{Equation 4}$$

$$\hat{y}_{inter}(x_i) = \sum_{p=1}^{s} \sum_{q>p}^{s} \sum_{j \in F_p} \sum_{k \in F_q} x_{ij} x_{ik} \langle v_{*qj}, v_{*pk} \rangle \qquad \text{Equation 5}$$

$$\hat{y}_{intra}(x_i) = \sum_{p=1}^{s} \sum_{j \in F_p} \sum_{(k>j) \in F_p} x_{ij} x_{ik} \langle v_{*pj}, v_{*pk} \rangle \qquad \text{Equation 6}$$

Equation 5 may be rewritten as Equation 7.

$$\hat{y}_{inter}(x_i) = \sum_{p=1}^{s} \sum_{q>p}^{s} \sum_{j \in F_p} \sum_{k \in F_p} x_{ij} x_{ik} \langle v_{*qj}, v_{*pk} \rangle$$

$$= \sum_{f=1}^{r} \sum_{p=1}^{s} \sum_{q>p}^{s} \sum_{j \in F_p} \sum_{k \in F_p} x_{ij} x_{ik} v_{fqj} v_{fpk}$$

$$= \sum_{f=1}^{r} \sum_{p=1}^{s} \sum_{q>p}^{s} \left( \sum_{j \in F_p} x_{ij} v_{fqj} \right) \left( \sum_{j \in F_q} x_{ij} v_{fpj} \right) \qquad \text{Equation 7}$$

Equation 6 may be rewritten as Equation 8.

$$\hat{y}_{intra}(x_i) = \sum_{p=1}^{s} \sum_{j \in F_p} \sum_{(k>j) \in F_p} x_{ij} x_{ik} \langle v_{*pj}, v_{*pk} \rangle$$

$$= \sum_{f=1}^{r} \sum_{p=1}^{s} \sum_{j \in F_p} \sum_{(k>j) \in F_p} x_{ij} x_{ik} v_{fpj} v_{fpk} \qquad \text{Equation 8}$$

-continued $$= \frac{1}{2}\sum_{f=1}^{r}\left[\sum_{p=1}^{s}\left(\sum_{j\in F_p}\sum_{j\in F_p} x_{ij}v_{fpj}\right)\left(\sum_{k\in f_p} x_{ik}v_{fpk}\right) - \sum_{j=1}^{m} x_{ij}^2 v_{f\alpha(j)f}^2\right]$$

$$= \frac{1}{2}\sum_{f=1}^{r}\sum_{p=1}^{s}\left(\sum_{j\in F_p} x_{ij}v_{fpj}\right)^2 - \frac{1}{2}\sum_{f=1}^{r}\sum_{j=1}^{m} x_{ij}^2 v_{f\alpha(j)j}^2$$

The Equations 3, 4, 5, 6, 7, and 8 may be recombined to generate Equation 9, where Equation 10 and Equation 11 apply.

$$\hat{y}(x_i) = \hat{y}_{bias}(x_i) + \sum_{f=1}^{r}\sum_{p=1}^{s}\sum_{q\geq p}^{s} c_{pq}a_{pqf}a_{qpf} - \frac{1}{2}\sum_{f=1}^{r}\sum_{j=1}^{m} x_{ij}^2 v_{f\alpha(j)j}^2 \qquad \text{Equation 9}$$

$$a_{pqf} \equiv \sum_{j\in F_p} x_{ij}v_{fqj} \qquad \text{Equation 10}$$

$$c_{pw} \equiv \begin{cases} \frac{1}{2} & \text{if } p = 1 \\ 1 & \text{otherwise} \end{cases} \qquad \text{Equation 11}$$

In some cases, the $\alpha_{pqf}$ terms may be precomputed and arranged into a tensor of dimension s×s×r. To assess the time complexity of populating this tensor, consider each slice as defined in Equation 12.

$$A_p \equiv \begin{bmatrix} a_{p11} & a_{p12} & \cdots & a_{p1r} \\ \vdots & \vdots & \ddots & \vdots \\ a_{ps1} & a_{ps2} & \cdots & a_{psr} \end{bmatrix} \qquad \text{Equation 12}$$

Note that each slice $A_p$ has dimension s×r, and computing each of its terms $\alpha_{pqf}$ takes $O(m_p)$ time due to Equation 8. This results in a time complexity of $O(m_p rs)$ for computing each slice $A_p$. Thus, to populate the whole tensor, the time complexity is set forth in Equation 13.

$$\sum_{p=1}^{s} O(m_p rs) = O(mrs) \qquad \text{Equation 13}$$

In addition, each of these s×s×r cells is consumed by Equation 9, so the time complexity of using this tensor is bounded by $O(rs^2)$. Ignoring the bias term and the subtracted part at the end of Equation 9, which are respectively computed in $O(m)$ and $O(mr)$ time, this results in a model prediction time complexity of: $O(mrs+rs^2)$. As each feature has exactly one field, and every field is nonempty, some aspects know s≤m, Which simplifies the prediction time complexity to $O(mrs)$.

A function $f$ of m variables $\theta_1, \ldots, \theta_m \in R$ can be decomposed into a set of functions g, $h_{lf}$ for 1≤l≤d and 1≤j≤m where Equation 14 applies, such that the collection of new variables $\phi_i \in R$ for 1≤i≤d satisfy a system of d additively separable equations on each variable $\theta_j$ for 1≤j≤m, where Equation 15 applies.

$$f(\theta_1, \ldots, \theta_m) = g(\phi_1, \ldots, \phi_d) \qquad \text{Equation 14}$$

$$\phi_1 = \sum_{j=1}^{m} h_{1j}(\theta_j) \qquad \text{Equation 15}$$

$$\vdots$$

$$\phi_d = \sum_{j=1}^{m} h_{dj}(\theta_j)$$

The resulting collection of functions is the d-separable decomposition of $f$. Furthermore, d is the degree of separability.

This manner of decomposition is motivated by the inherent parallelizable structure of computation over the parameters. Each $\phi_1; : : : ; \phi_d$ can be computed in parallel from each parameter $\phi_1; : : : ; \phi_m$ which is explicit in the vectorized form of the equation in Equation 15. Thus, Equation 16 and Equation 17 apply.

$$\phi = \sum_{j=1}^{m} h_j(\theta_j) \qquad \text{Equation 16}$$

$$h_j(\theta_j) = \begin{pmatrix} h_{1j}(\theta_j) \\ \vdots \\ h_{dj}(\theta_j) \end{pmatrix} \qquad \text{Equation 17}$$

In Equations 15, 16, and 17, $\theta=(\theta_1, \ldots, \theta_m)$ and $\phi=(\phi_1, \ldots, \phi_d)$. It should be noted that $\phi$ may be computed in parallel by computing each $h_j(\theta_j)$ in parallel over 1≤j≤m and summing over their results.

Vectorized notation may be used. Aspects relate to decompositions that minimize d for use in parallel algorithms. Minimizing d minimizes memory overhead within a single machine (e.g., computation server 120.k) and communication overhead within distributed environments. Observe that a trivial decomposition exists for all functions by letting g=$f$ and choosing each $h_j$ such that $\phi=\theta$ for 1≤j≤m, which results in d=m. Thus, it is always the case that there exists d such that d≤m.

When the feature vector x and global bias $w_0$ are held constant, the FFM is a function of mrs+m in variables, which are the parameters of the model of Equation 18.

$$f(w,V)=y(x;w_0,w,V) \qquad \text{Equation 18}$$

It can be shown that $f$ is d-separable where $d=rs^2+2$ where r is the number of latent factors and s is the number of fields. To simplify the decomposition, consider a decomposition of $h_j$ into the sum of two simpler functions: $h_j^{(w)}$ which is a function of the feature biases w and $h_j^{(V)}$ which is a function of the latent vectors V. Both $h_j^{(w)}$ and $h_j^{(V)}$ have the same range as $R^d$, and Equation 19 applies.

$$f(w, V) = g\left(\sum_{j=1}^{m} h_j^{(w)}(w_j) + \sum_{j=1}^{m} h_j^{(V)}(V_j)\right) \qquad \text{Equation 19}$$

A machine can derive g and $h_j^{(w)}$, $h_j^{(V)}$ for each 1≤j≤m from the model equation of the FFM. The FFM model equation is set forth as Equation 20, where Equations 21-24 apply.

$$\hat{y}(x; w_0, w, V) = w_0 + \phi^{(1)} + \sum_{f=1}^{r}\sum_{p=1}^{s}\sum_{q \geq p}^{s} c_{qp}\phi^{(2)}_{fqp}\phi^{(2)}_{fpq} - \frac{1}{2}\phi^{(3)}$$ Equation 20

$$c_{qp} = \begin{cases} \frac{1}{2} & \text{if } p = q \\ 1 & \text{otherwise} \end{cases}$$ Equation 21

$$\phi^{(1)} = \sum_{j=1}^{m} w_j x_j$$ Equation 22

$$\phi^{(2)} = \sum_{j=1}^{m} x_j \pi_{\alpha(j)}(V_j)$$ Equation 23

$$\phi^{(3)} = \sum_{j=1}^{m} x_j^2 \sum_{f=1}^{r} v_{f\alpha(j)j}^2$$ Equation 24

It should be noted that $\pi_p$ is the projection $V_j$ into index p of dimension 3 of a 3-dimensional tensor. The machine begins by constructing each $h_j^{(w)}$ and $h_j^{(V)}$ which is to produce a d-dimensional vectors. Let $\Phi = R \times R^{US2} \times R$ be the space of $\phi = (\phi^{(1)}; \phi^{(2)}; \phi^{(3)})$ objects $\Phi$ is a vector space which is the range of $h_j^{(w)}$ and $h_j^{(V)}$. These functions compute the fallowing quantities shown in Equations 25 and 26.

$$h_j^{(w)}(w_j) = \begin{pmatrix} w_j x_j \\ 0 \\ 0 \end{pmatrix}$$ Equation 25

$$h_j^{(V)}(V_j) = \begin{pmatrix} 0 \\ x_j \pi_{\alpha(j)}(V_j) \\ x_j^2 \sum_{k=1}^{r} v_{f\alpha(j)j}^2 \end{pmatrix}$$ Equation 26

The sum of $h_j^{(w)}$ and $h_j^{(V)}j$ over all $1 \leq j \leq m$ results in the desired $\phi$ vector of Equation 26' that satisfies Equations 19, 20, and 21.

$$\phi = \begin{pmatrix} \phi^{(1)} \\ \phi^{(2)} \\ \phi^{(3)} \end{pmatrix} = \begin{pmatrix} \sum_{j=1}^{m} w_j x_j \\ \sum_{j=1}^{m} x_j \pi_{\alpha(j)}(V_j) \\ \sum_{j=1}^{m} x_j^2 \sum_{f=1}^{r} v_{f\alpha(j)j}^2 \end{pmatrix} = \sum_{j=1}^{m} h_j^{(w)}(w_j) + \sum_{j=1}^{m} h_j^{(V)}(V_j)$$ Equation 26' in Equation 27, g is constructed as a remaining functional form of $\hat{y}$ as a function of $\phi$.

$$g(\phi) = w_0 + \phi^{(1)} + \sum_{f=1}^{r}\sum_{p=1}^{s}\sum_{q \geq p}^{s} c_{qp}\phi^{(2)}_{fqp}\phi^{(2)}_{fpq} - \frac{1}{2}\phi^{(3)}$$ Equation 27

It can be observed that the resulting Equation 28 is equivalent to $\hat{y}$.

$$g\left(\sum_{j=1}^{m} h_j^{(w)}(w_j) + \sum_{j=1}^{m} h_j^{(V)}(V_j)\right) = \hat{y}(x; w_0, w, V)$$ Equation 28

Hence, $f$ is d-separable where $d = rs^2 + 2$. This result is interesting because $d < n$ where $n = mrs + mr$.

In addition to distributing training data, the parameters of large models may be distributed to leverage parallelism across a cluster. For example, recommendations systems at professional networking services may include billions of parameters. Some aspects relate to an approach to distributed training d-separable decompositions of models on sparse data using the Bulk Synchronous Parallel (ESP) model of computation. This approach leverages data sparsity and the degree of separability to reduce the communication overhead in a distributed procedure.

Training may be formulated as an optimization problem of the form set forth in Equation 29.

$$\hat{\theta} = \underset{\theta}{\operatorname{argmin}} \sum_{i=1}^{n} l(\hat{y}(x_i; \theta), y_i)$$ Equation 29

Equation 29 uses a labeled example set $D = \{(x_i, y_i)\}_{i=1}^{n}$ of feature vectors $x_i \in R^q$ and labels $y_i \in R$, a differentiable loss function $l(\hat{y}_i; y_i)$ over predictions $\hat{y}_i$ and labels $y_i$; and a model equation $\hat{y}(x; \theta)$ over feature vectors x and parameterized by $\theta \in R^m$. Some aspects would like to compute the parameters that minimize the sum of the loss values after applying the model equation to each feature vector in the labeled example set. In a distributed environment, this optimization problem is difficult to solve efficiently due to the significant number of complicating variables $\theta$. To parallelize the computation, some aspects make the objective function additively separable in the variables.

To achieve additive separability, some aspects reformulate the optimization problem by fixing, constants and using d-separable decompositions of the model equation. Since the labeled example set is fixed during training, some aspects assume that the labeled example set can be distributed so that some aspects can fix a loss application and model application to each labeled example leading to 2n new functions, represented as Equation 30.

$$\hat{y}_i(\theta) = \hat{y}(x_i; \theta)$$

$$l_i(\hat{y}_i) = l(\hat{y}_i(\theta), y_i)$$ Equation 30

These new functions allow reformulation of the optimization problem strictly in terms of the parameters, as shown in Equation 31, which is subject to Equation 32. Thus, d-separable decompositions enable reformulation of the objective function to be additively separable.

$$\hat{\theta} = \underset{\theta}{\operatorname{argmin}} \sum_{i=1}^{n} l_i(\hat{y}_i(\theta))$$ Equation 31

$$\phi_i = \sum_{j=1}^{m} h_{ij}(\theta_j), \quad i = 1, \ldots, n.$$ Equation 32

From Equation 31, some aspects are interested in optimizing $\theta$ while keeping each $\phi_1, \ldots, \phi_n$ feasible. Some aspects solve this problem by parallelizing updates in a descent method. This method could have been applied to the original problem; however, the introduction of the $\phi_1, \ldots, \phi_n$ variables exposes a two-stage, parallel dynamic programming procedure for each update iteration, as shown in Equation 33, where $f_0$ is the objective function of Equation 34.

$$\theta \leftarrow \theta - \eta \nabla_\theta f_0(\phi_1, \ldots, \phi_n) \quad \text{Equation 33}$$

$$f_0(\phi, \ldots, \phi_n) = \sum_{i=1}^{n} l_i(g_i(\phi_i)), \quad i = 1, \ldots, n. \quad \text{Equation 34}$$

It should be observed that the gradient of the objective function with respect to the original parameters $\nabla_\theta f_0(\phi_1, \ldots, \phi_n)$ may be computed in parallel if the $\phi_1, \ldots, \phi_n$ variables were precomputed. So, a single iteration of gradient descent may use two super-operations in a distributed algorithm. First, compute $\phi_1, \ldots, \phi_n$ in parallel given $\theta_1, \ldots, \theta_m$. $\theta_m$. Second, update $\theta_1, \ldots, \theta_m$ in parallel after computing $\nabla_\theta f_0(\phi_1, \ldots, \phi_n)$. The full algorithm is outlined in Algorithm 1.

---

Algorithm 1: Seperable Gradient Descent

Data: Parameters θ, feature matrix X, and a label vector y
Result: Optimized parameters $w_0$ and Θ
1  while not converged do
    | # Inner pass
2   | for j ← 1 to m do in parallel
3   |   | for i ∈ $I_j$ do
4   |   |   | $h_{ij} \leftarrow h_{ij}(\theta_j)$
5   |   | end
6   | end
    | # Outer pass
7   | for i ← 1 to n do in parallel
8   |   | $\phi_i \leftarrow \Sigma_{j \in J_i} h_{ij}$
9   |   | for j ∈ $J_i$ do
10  |   |   | $\frac{\partial l_i}{\partial g_i} \leftarrow \frac{\partial l_i}{\partial \theta_j} \frac{\partial g_i}{\partial \theta_j}$
11  |   | end
12  | end
    | # Update pass
13  | for j ← 1 to m do in parallel
14  |   | $\omega_j \leftarrow \sum_{i \in I_j} \frac{\partial l_i}{\partial \theta_j}$
15  |   | $\theta_j \leftarrow \theta_j - \eta \omega_j$
16  | end
17 end
18 return θ

---

The communication cost of the inner pass is O(nd). The communication cost of the outer pass is O($m\bar{n}$). The total communication cost of a single iteration is O(nd+$m\bar{n}$). Observe that a naïve implementation would result in O(n$\bar{m}$+$m\bar{n}$).

A variety of subsystems may be leveraged to reduce the running time of local computations, the communication overhead, and the storage overhead. Some examples of the design of each subsystem and their responsibilities are discussed below.

Aspects are described with respect to the FFM model framework. However, the problems these techniques solve may apply to any models, which have large parameter spaces such as Deep Learning models, Matrix Factorization, and others.

In some embodiments, the fragments system describes an optimized set of data structures. An object is considered a fragment if it can be combined pairwise with another object of the same type such that the information from one object is merged into the other object without allocating a new object.

Typically, a fragment is an object that may be used to construct an instance of some tensor. Consider the example of constructing a sparse vector. A collection n fragments of this sparse vector must also be sparse vectors. Combining n fragments naïvely in pairs as immutable objects may produce O(n) temporary objects. The destructive property of absorption prevents allocation unless explicitly required.

In some aspects, there are two distributed data sources: the labeled example set D and the parameters $\theta \in R^m$. The current format of D as an ordered set is inflexible for distribution D is decomposed further into a feature matrix $X \in R^{nq}$ and a label vector $y \in R^n$. Some aspects construct row vector i of X from $x_i \in D$ for each $1 \leq i \leq n$. Each element in the label vector y is constructed from each $y_i \in D$.

It should be noted that there are two reusable schemes: sharding based on the example index $h_n$: $\{1, \ldots, n\} \rightarrow \{1, \ldots, \bar{n}\}$ and sharding based on the feature index $h_n$: $\{1, \ldots, q\} \rightarrow \{1, \ldots, \bar{n}\}$. The values X and y may be sharded by example indices. The value X may be sharded by feature indices. The value y is sharded by its example index. Some aspects refer to $X_j$ as the column vector j of the matrix X that is sharded by feature index. Some aspects refer to $x_i$ as the row vector of the matrix X that is sharded by example index. To distribute θ, some aspects create a sharding scheme by composing $h_q$ with a new sharding scheme that maps $\{1, \ldots, m\}$ to $\{1, \ldots, q\}$.

In the BSP model, $X_j$ is guaranteed to be collocated with $\theta_j$ for each $1 \leq j \leq q$ and $x_i$ is guaranteed to be collocated with $y_i$ for each $1 \leq i \leq n$. The collocation of data enables performing local operations on the data sharded by the same index.

When the feature matrix X has both dense features and sparse features, the training algorithm is inefficient because the work becomes unevenly distributed across the cluster. Note that a dense feature occurs in every example and a sparse feature typically only occurs in very few examples.

It can be observed that the processors assigned with dense features do the most work between the inner pass and outer pass since they must replicate work for each example the original data source. To alleviate this issue, some aspects decompose the feature matrix X into dense and sparse subsets $X_d$ and $X_s$. The sparse subset $X_s$ is handled as dictated by the original distributed training algorithm. The dense subset $X_d$ is instead broadcasted to each machine as a local cache where feature values may be fetched in constant time during the outer pass.

Since the labeled example set D is typically sharded by example index already, sharding X by example index is trivial since each row of X is already on the correct processor. Sharding X by feature index requires a distributed, sparse matrix transpose algorithm, which is performed using the fragments system.

Some techniques related to modeling are disclosed below. Modeling may refer to techniques to train machine learning (ML) models for specialized machine learning tasks or to counteract degenerate circumstances that may occur in practice.

Training a model from a dataset (which may include one or multiple data sources) with a single label is difficult because no negative examples are provided. (E.g. It is difficult to predict what kinds of people Company X would hire based on a list of its employees, because this list does not allow the machine to analyze examples of people who were not hired by Company X. Similarly, if a machine is provided with multiple photographs of cats, the machine might not be able to learn to identify whether a photograph includes a cat, because it lacks examples of photographs that lack cat(s).) This type of data with a single label typically comes from implicit data sets such as click-through data. This is a degenerate circumstance. For example, training a model $\hat{y}(x; \Theta)$ to predict that the label is always 1 is easy: let $w_0$ be 1 and all other parameters be 0. This degenerate case may be alleviated with a technique described here as negative sampling for data sets with extremely sparse features.

The negative sampling procedure creates a new data set $\overline{D}=\{(\overline{x}_i, y_i)\}$ where each $\overline{x}_i$ is the sampled features and each $y_i$ is the designated negative label, which typically has a value of 0 or −1 for binary classification but can also be assigned a confidence score based on the data set distribution.

The negatively sampled feature matrix $\overline{X}$ may be constructed as follows. Consider the original feature matrix $X$. Choose some feature index $j$ that is strongly dependent on the other features. Shuffle column $X_j$. The resulting matrix is $\overline{X}$. With an extremely sparse feature matrix, this results in a data source of improbable feature combinations which are typically negative cases. For example, consider a data set of company co-occurrence on member profiles. Suppose that it is desirable to predict which companies may co-occur in a pairwise fashion with another company. The positive examples may be directly extracted from member profiles. Negative examples cannot be directly extracted from member profiles. However, if the existing positive example data set is taken and one of the two companies in each example pair are randomized, then improbable combinations that may act as a surrogate for negative examples are obtained. This strategy is feasible due to the sparsity of the data set: given any company, they are statistically unlikely to co-occur with any random company.

Some aspects disclose details on optimizing the negative sampling algorithm at scale in a distributed system. Observe that the algorithm requires shuffling a feature column. For data sets that are sharded by example, this is an expensive operation since it requires data movement between multiple machines. Some aspects avoid all data movement between machines (e.g., computation servers 120) by performing local, in-machine shuffles of the partition-local feature column data. This approximation is sufficient for randomness while significantly reducing the running time of the overall algorithm and completely eliminating network overhead.

The Continuous Bag of Words (CBOW) and Skipgram neural network architectures are used in the Natural Language Processing (NLP) community. These architectures were designed to generate semantic word embeddings. The FM and by extension, the FFM, are able to approximately imitate these models and generate word vectors with carefully designed feature matrices. Some aspects have successfully implemented a variety of word embedding models using FFMs for applications such as areas of expertise refinement questions and company suggestion refinement questions in job search or hiring computer-implemented products.

To begin with the derivation of the imitation of CBOW and Skipgram, consider a simple example using the CBOW architecture. Suppose there is a sentence "The cat climbed a tree." The CBOW architecture may take "the cat a tree" context as input and attempt to predict the holdout word climbed. Each word has two associated vectors depending on whether it is being used as context or holdout. The embedding vector is conventionally chosen to be the context vector. In the presence of multiple context words such as in the example, the vectors are averaged. The intuition is that words that co-occur in the same context are semantically similar.

To imitate the CBOW architecture using FFMs, some aspects create two fields: context and holdout. Given each sentence, for example, "The cat climbed a tree," some aspects construct several example using a sliding window while assigning each word with a field of context or holdout as appropriate. Hence, each word has four vectors associated with it: two features for the context version and the holdout version and each feature has two vectors for interacting with each field. Two of four of the vectors are unnecessary since some aspects are primarily interested in context-holdout and holdout-context interactions. By restricting the vector interactions, some aspects are able to approximately achieve the CBOW architecture.

To imitate the Skipgram architecture using FFMs, some aspects observe that the Skipgram architecture can be seen as CBOW with the fields swapped: given a single holdout word, predict a context set of words.

Finally, it is worth discussing why the FFM is an approximation rather than a complete imitation. For the purpose of speed and scale, the FFM typically measures pairwise interactions between features while CBOW and Skipgram measure c-interactions where c is the size of the context window. When the CBOW and Skipgram architectures operate on context windows of size two, then the FFM can exactly imitate these architectures. Furthermore, it is worth noting that the higher-order extensions of the FFM also measure c-interactions; however, it is frequently observed to add negligible predictive power for the cost of speed.

Sets of features such as a company history are typically treated as a bag of words. This means that each company is encoded in a feature vector and typically has no notion of order. To model chronology of features, for example, given a set of companies on a member's profile where most recent companies are determined to be more important, some aspects implement time-weighting. Time-weighting is a simple notion of either linearly or exponentially assigning weights to the set of history items.

For example, suppose some aspects determine that more recent companies on a member profile are more relevant to the prediction task. Some aspects may exponentially weight the companies on a member profile such that the most recent company has the largest weight.

From the standardized member profiles of a professional networking service, some aspects train a model that is able to predict the next company that may employ the member of the professional networking service. The model is trained by observing the work history of the member. Consider a single member. Some aspects remove the member's current company and train the model to predict the held out company given the list of previous companies where the member has worked. This modeling strategy is an application of the CBOW and Skipgram imitation. Furthermore, the negative sampling modeling technique is applied to generate negative examples. Finally, some aspects apply the time weighting over the companies in the work history to account for chronology. The model may be trained this way over all members in a data repository of a professional networking service. Once the model is trained, some aspects provide the model with a full list of companies from any given member and produce a ranked list of companies that the member may work for next.

Title recommendation proceeds similarly to company recommendation except that some aspects train the model over each member's titles (rather than companies) in his/her work history. Title expansion is very similar to the above title recommendation problem. The main difference is that title recommendation seeks to find a cause-effect relationship between job history and future jobs, whereas title similarity is non-temporal in nature. Thus, some aspects use the same CBOW-inspired approach as above, but instead of holding out a member's most recent title, some aspects hold out a random title. In addition, each title in the job history has equal weight, instead of applying a temporal weighting scheme.

When a user (e.g., a recruiter) provides information about a target role, some aspects ask if a number of areas of expertise are relevant for what the user is seeking. To produce the areas of expertise that are presented to the user, some aspects use a FFM to learn association strength between titles and skills. Each training example is pulled from real profiles and associations are embedded into latent vectors of the FFM parameters. The latent vectors are then grouped based on a pre-existing model of groups defining an "area of expertise" to produce a single area of expertise latent vector. Then for any given target role, some aspects compute the top areas of expertise that are highly associated to the target role, but most disassociated from each other using the latent vectors.

Some aspects produce a model that uses the target job parameters (e.g. title, company, geographic location, and the like) to score matches with a user's (e.g., a recruiter's) personal network. The model extracts a number of properties, particularly prior work history from each member in the user's network and scores fit with the target role based on interaction between entities. Some aspects choose a number of top candidates to present to the user as "suggested candidates" and ask if any of the candidates are representative of who they user is trying to hire. This information is used to refine the future recommendations.

Figure 2:
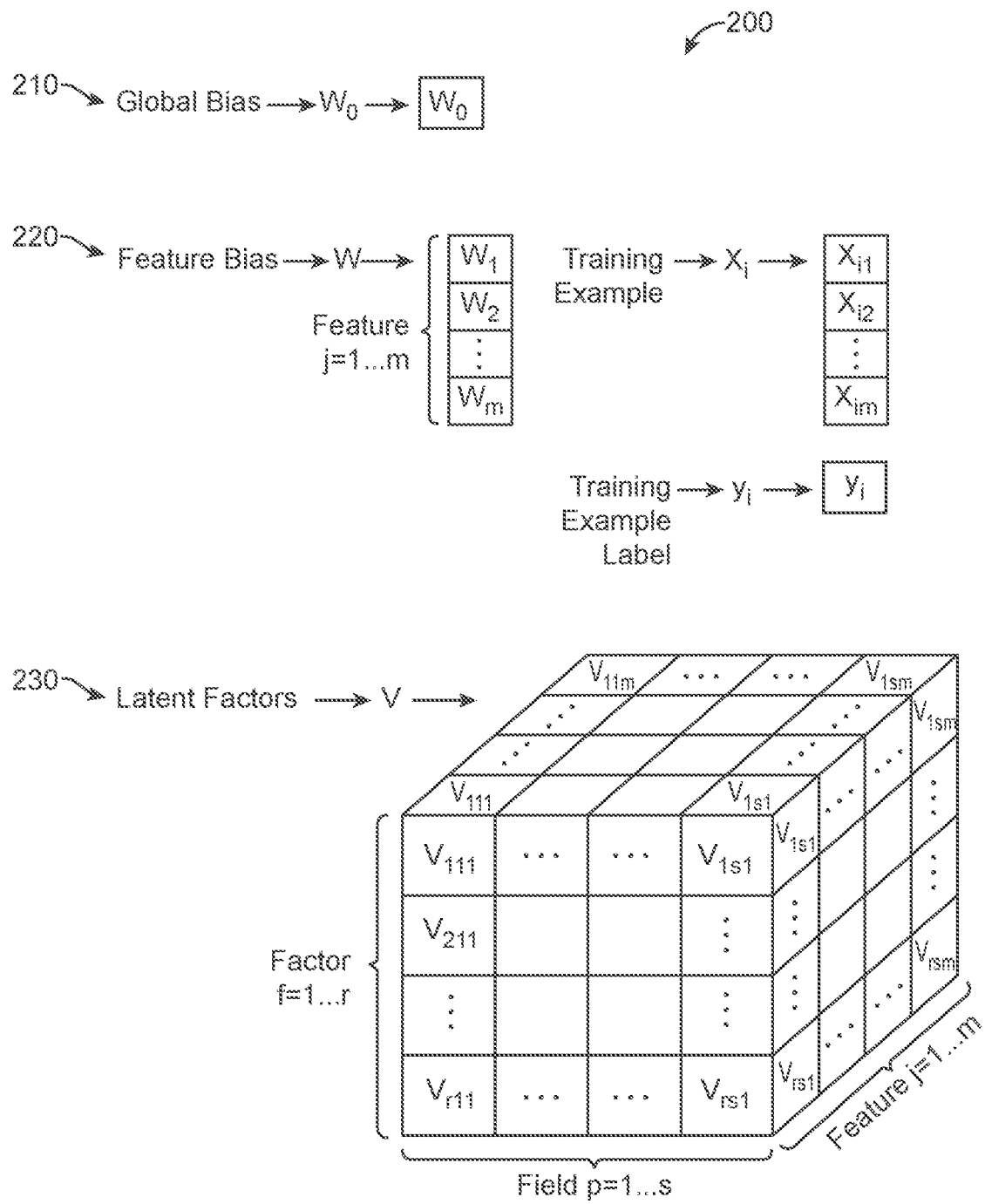
FIG. 2 is a diagram illustrating an example of model parameters for predicting feature values in a matrix, in accordance with some embodiments.

FIG. 2 is a diagram 200 illustrating an example of model parameters for predicting feature values in a matrix, in accordance with some embodiments. The data structures of FIG. 2 may be stored at or computed via the control server 110. In some cases, the data structures of FIG. 2 are learned and stored in a distributed fashion (via sharding) during training. The data structures may be sored and used for prediction in a centralized way.

The global bias 210 is a single value $w_0$. The feature bias 220 corresponds to a feature vector w which includes the values $w_1, \ldots, w_m$. A training example vector $x_i$ is provided with the values $x_{i1}, \ldots, x_{im}$. A training example label $y_i$ is also provided.

The latent factors 230 are shown in a three-dimensional matrix V. As shown, the matrix V has dimensions for factor (f=1, ..., r), field (p=1, ..., s), and feature (j=1, ..., m). Each cell in the matrix V is labeled with a value for f, p, and j, in that order.

Figure 3:
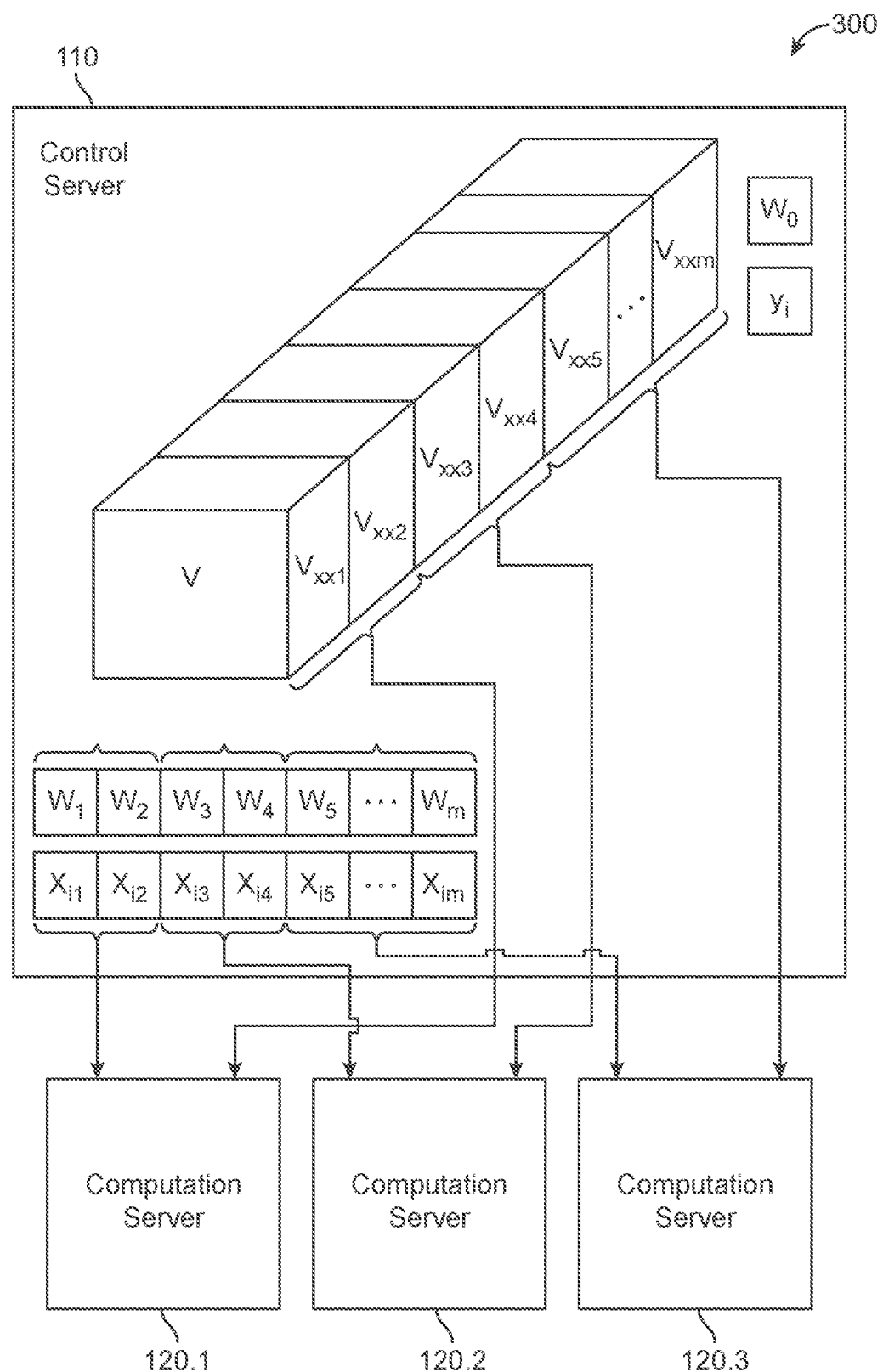
FIG. 3 is a data flow diagram for predicting feature values in a matrix, in accordance with some embodiments.

FIG. 3 is a data flow diagram 300 for predicting feature values in a matrix, in accordance with some embodiments. As shown, the data flow diagram 300 includes the control server 110 and the computation servers 120.1-3 of FIG. 1.

The control server 110 stores the matrix V the vectors w and $x_i$, and the values $w_0$ and $y_i$. As shown, the matrix V is sharded—divided into three submatrices along the feature dimension, with each of the three submatrices being assigned to one of the three computation servers 120.1-3. The vectors w and $x_i$ are also sharded—divided into three subvectors, with each of the three subvectors being assigned to one of the three computation servers 120.1-3. The parameters $w_0$ and $y_i$ are not sharded, as $w_0$ is a scalar and $y_i$ is not used for prediction. All of the sharded parameters are sharded along the feature dimension j. In other words, each of the computation servers 120.k is responsible for a given range of j values. As shown, the computation server 120.1 is responsible for j values 1 and 2; the computation server 120.2 is responsible for j values 3 and 4; and the computation server 120.3 is responsible for j values 5 through m.

Consider what happens at a single computation server 120.k. The computation server 120.k is responsible for a range of j values (features). For simplicity, suppose the range covers only a single value j. This value j may correspond to a single feature, for example, the company "ABC Corporation," or the title "legal assistant." The stored data about this feature includes: $w_j$ (the feature bias), $x_j$, (the training example for the feature value, which may be greater than zero if the feature is present or zero if the feature is absent), and $V_j$ (a two-dimensional matrix corresponding to the slice of three-dimensional matrix V for the feature j). The goal is to compute the shard's values of $\varphi^{(1)}$, $\varphi^{(2)}$, and $\varphi^{(3)}$. $\varphi^{(1)}$ is computed according to Equation 35. $\varphi^{(3)}$ is computed according to Equation 36, where p is the field of j. For example, if j referenced "ABC Corporation," p would reference "employer." If j referenced "legal assistant," p would reference title. Labels may be handled in a similar manner to the examples.

$$\varphi^{(1)} = w_j * x_{ij} \quad \text{Equation 35}$$

$$\varphi^{(3)} = x_j^2 \Sigma_{f=i}^r V_{fpj}^2 \quad \text{Equation 36}$$

$\varphi^{(2)}$ is more complicated, as it is not just as scalar, but is the s×s×r tensor A referenced above. $\varphi^{(2)}$ is a full s×s×r tensor. However, for a particular feature j and its field p, in some embodiments, only the values in slice p of the tensor are computed. Different features may affect different slices of A's sub-tensors, so that when they are comparted, A is fully populated.

Figure 4:
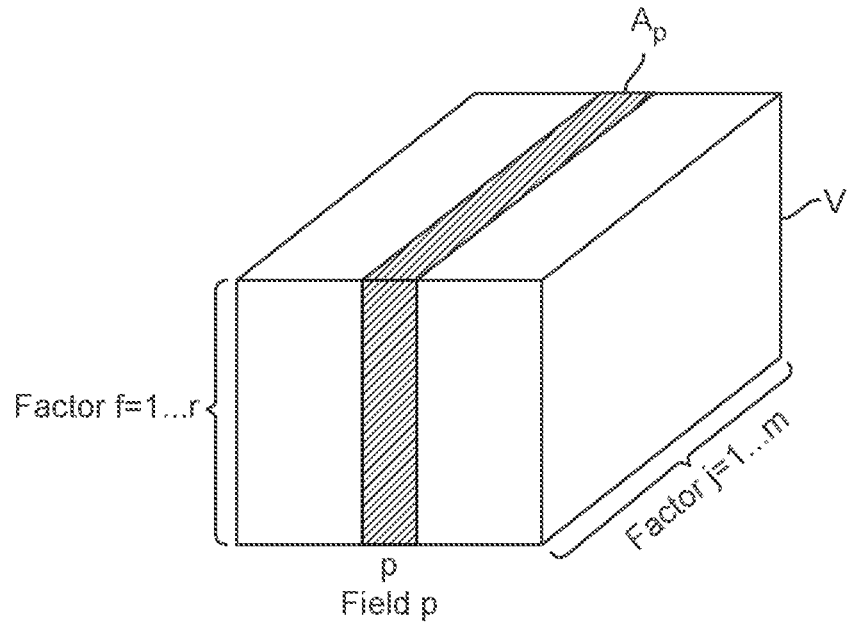
FIG. 4 illustrates a slice of the three-dimensional matrix, in accordance with some embodiments.

FIG. 4 illustrates a slice $A_p$ of the three-dimensional matrix V. To calculate $A_p$ for just this j, it is simply the scalar-matrix product $x_{ij} * V_j^T$, so $A_{fpj} = x_{ij} *$ for all f=1 . . . r and j=1 . . . m. The superscript 'T' indicates a transpose operation.) To finish computing A, the computation server 120.k takes each $A_j$ produced above and adds them together. The same occurs with the $\varphi^{(2)}$ and $\varphi^{(3)}$ shards. It should be noted that this is a "reduce" step that combines the results for every machine. Once $\varphi^{(1)}$, A and $\varphi^{(3)}$ are present, the prediction can be computed on the computation server 120.k via Equations 7 and 8.

Figure 5:
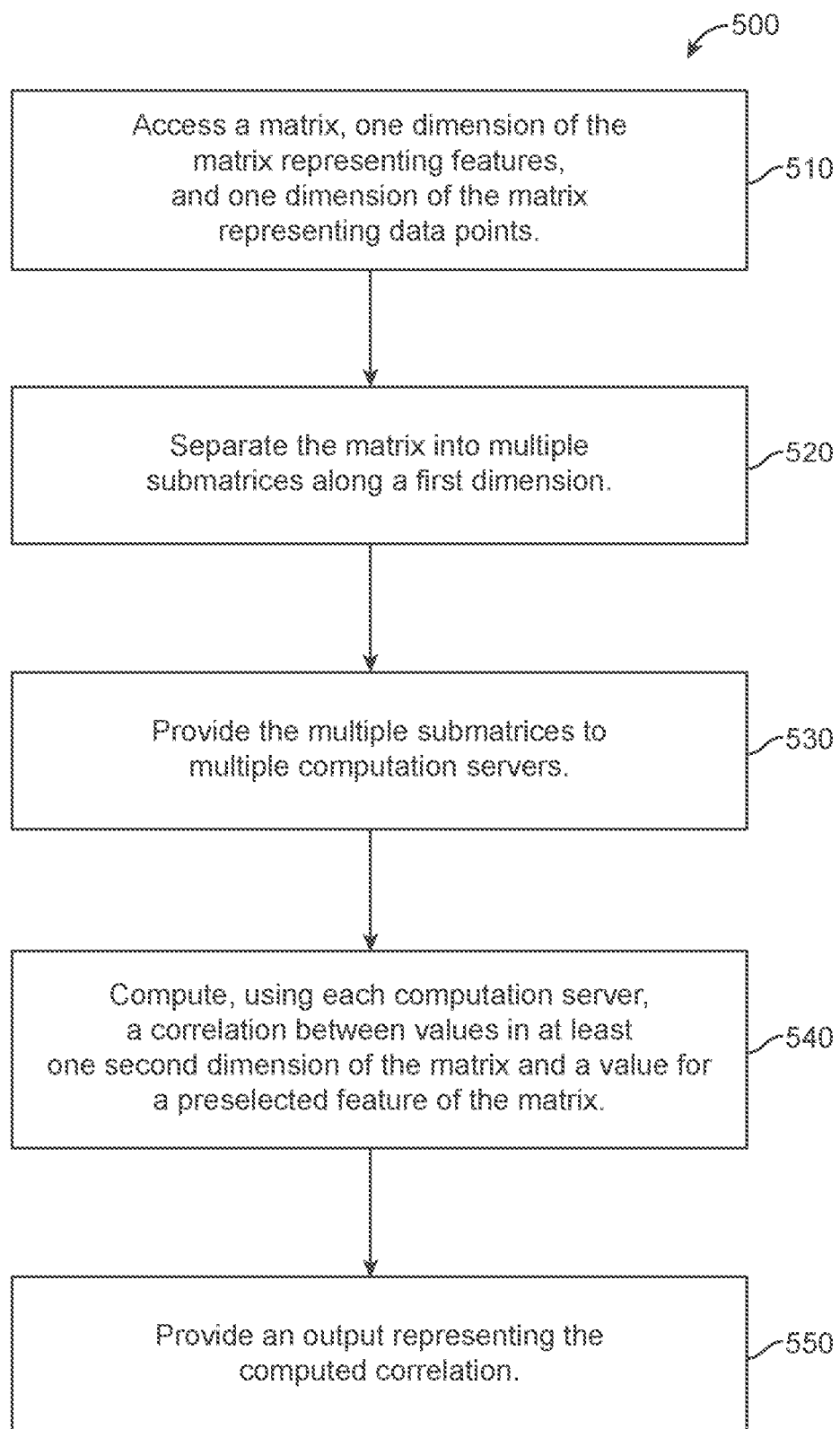
FIG. 5 is flow chart of a method for training a machine, in accordance with some embodiments.

FIG. 5 is flow chart of a method 500 for training a machine, in accordance with some embodiments. The method 500 is described here as being implemented at the control server 110 of the system 100. However, the method 500 may be implemented at other machine(s) or in other system(s).

At operation 510, the control server 110 accesses a matrix, such as an example matrix with features. The matrix has multiple dimensions. One dimension of the matrix represents features. Another dimension of the matrix represents data points.

At operation 520, the control server 110 separates the matrix into multiple submatrices along a first dimension (e.g. the feature dimension as shown in FIG. 3). Each submatrix includes all cells in the matrix for a set of values in the first dimension.

At operation 530, the control server 110 provides the multiple submatrices to multiple computation servers 120. In some examples, each computation server 120.k is provided with a single submatrix.

At operation 540, the control server 110 causes each computation server 120.k to compute a correlation between values in second dimension(s) (e.g. the factor dimension and/or the field dimension) of the matrix and a value for a preselected feature of the matrix. The correlation is used to predict the values of the preselected feature based on the values along the second dimension(s). The correlation between the second dimension(s) of the matrix and the feature value may be based on a differentiable mathematical function applied to values in the at least one second dimension. In one example, the feature dimension represents employers. One of the second dimension(s) represents individuals. A non-zero value in a cell of the matrix represents that the individual is a current or former employee of the employer. In some cases, another one of the second dimension(s) represents area(s) of expertise, current or former educational institution(s) attended, or degree(s) earned. In some embodiments, computing the correlation includes computing, for at least one additional feature different from the preselected feature, a probability that, for a slice of the matrix along the at least one second dimension, the preselected feature has a non-zero value given that the at least one additional feature has a non-zero value. The correlation may be computed based on the non-zero values in a slice along the at least one second dimension and the computed probability. In some examples, the operation 520 includes separating the matrix into submatrices along the feature dimension. The preselected feature of operation 540 is one of the features along the feature dimension.

At operation 550, the control server 110 provides an output representing the computed correlation (or any other prediction. The output may be stored in a data repository coupled with the control server 110 or displayed at the client device 130. In some cases, the control server 110 receives a new submatrix including values along the second dimension(s). In some implementations, the control server 110 predicts, using the computed correlation, a value for the preselected feature for the new submatrix. In some cases, the output includes a combination of correlations, and the semantics of the output is designed based on the type of prediction task.

Figure 6:
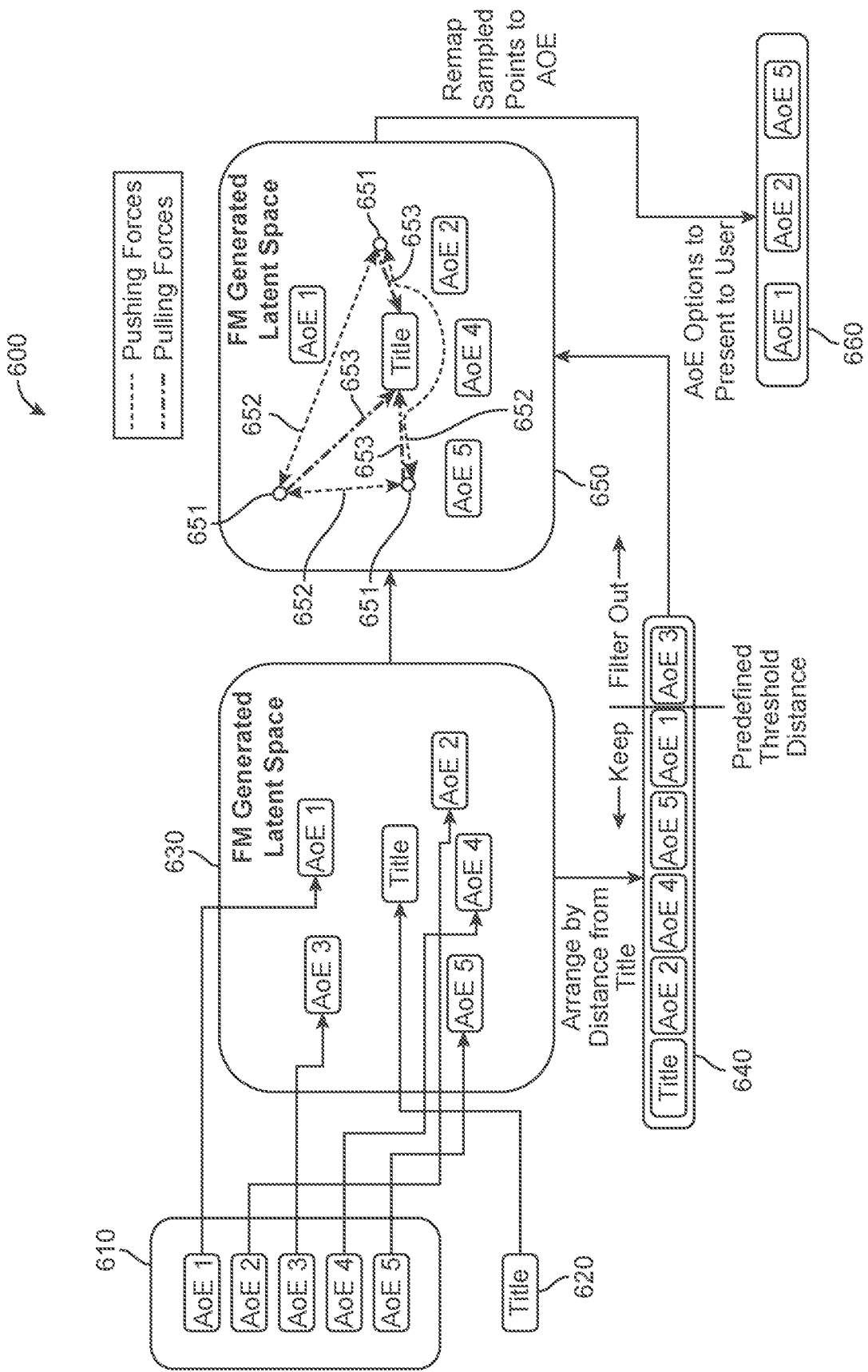
FIG. 6 is a schematic diagram of a technique for associating a title with at least one area of expertise, in accordance with some embodiments.

FIG. 6 is a schematic diagram of a technique 600 for associating a title with at least one area of expertise (AoE). In some aspects, the technique 600 associates a title with an AoE by trying to balance relevance and variety simultaneously.

At block 610, a plurality of areas of expertise (AoEs 1-5) are accessed by the computation server 120.k. While five areas of expertise are presented here, the technology may be implemented with any number of areas of expertise. In some examples, the computation server 120.k accesses (e.g., via the network 140 or via the control server 110) a data repository storing thousands of areas of expertise. The areas of expertise may correspond to professional areas of expertise, such as "web development," "back end development," "front end development," "patent drafting and prosecution," or "patent litigation."

At block 620, a title is accessed by the computation server 120.k. The title may correspond to a professional title, such as "senior software engineer," "patent attorney," or "insurance agent."

At block 630, the areas of expertise (from block 610) and the title (from block 620) are mapped, by the computation server 120.k, to a FM generated latent space. As shown, the FM generated latent space is two-dimensional. However, in some embodiments, a latent space with more than two dimensions (e.g., three, four, or five dimensions) may be used. To generate this mapping, latent vectors learned by a factorization machine trained on examples of <Current Title, Skills> tuples are extracted from a data store. In some examples, the data store stores member profiles from a professional networking service. According to some examples, the computation server 120.k extracts training examples from the data store. Each training example includes a <current title, skills> tuple. The computation server 120.k trains a factorization machine. It should be noted that latent vectors learned by the factorization machine may be viewed as a mapping of titles to the latent space and a mapping of skills to the latent space. In other words, for each title, there is a vector that numerically represents the title. For each skill, there is a vector that numerically represents the skill.

At block 640, the areas of expertise are arranged, at the computation server 120.k, by distance from the title in the latent space of block 630. Areas of expertise having a greater distance from the title than a predefined threshold distance (e.g., AoE 3, as shown) are filtered out. The remaining areas of expertise (e.g., AoE 2, AoE 4, AoE 5, and AoE 1) are provided to block 650.

At block 650, the remaining areas of expertise (from block 640) and the title are mapped, by the computation server 120.k, onto the latent space from block 630. Three random points 6511 are mapped onto the latent space. Pushing forces 652 are modeled from each random point 651 to each other random point 651. Pulling forces 653 are modeled from each random point 651 to the title. The direction of the forces 652 and 653 is computed by subtracting the latent vectors. For example, to compute the pulling force 653 to the title, the computation server 120.k computes: Latent Vector (Title)-Latent Vector (point). Then the computation server 120.k normalizes the result to have a unit vector representing the direction of the force. The magnitude of each of the forces 652 and 653 may be a hyper-parameter. The hyper-parameter could be changed to something that is similar to a magnet (e.g., higher magnitude when close together) or some other scheme. In some cases, a constant force magnitude may be used. In some cases, an early stopping mechanism may be used. In other words, there may be a configurable number of iterations to determine when equilibrium is reached. In one example, five iterations are performed before the simulation of the forces is stopped. After the simulation of the forces is completed, the sampled points are remapped to areas of expertise.

As described in conjunction with block 630, there is a mapping of skill to latent vector from the factorization machine. A latent vector can be constructed to represent any area of expertise by averaging the vectors of its constituent skills. It should be noted that this provides a mapping from an area of expertise to its corresponding vector. Originally, all of the entities of interest—titles and areas of expertise are mapped to the latent space of block 630. The latent space is used for mathematical operations. However, the result of these operations is a vector in the latent space, which is converted to an entity of interest before being provided as output to a user.

At block 660, The three areas of expertise closest to the title after the simulation (e.g., AoE 1, AoE 2, and AoE 5) are presented to a human user via a client device 130 in communication with the computation server 120.k (e.g., via the network 140). The human user specifies which, if any, of the areas of expertise are applicable to the title. The areas of expertise selected by the human user are transmitted to the computation server 120.k.

Figure 7:
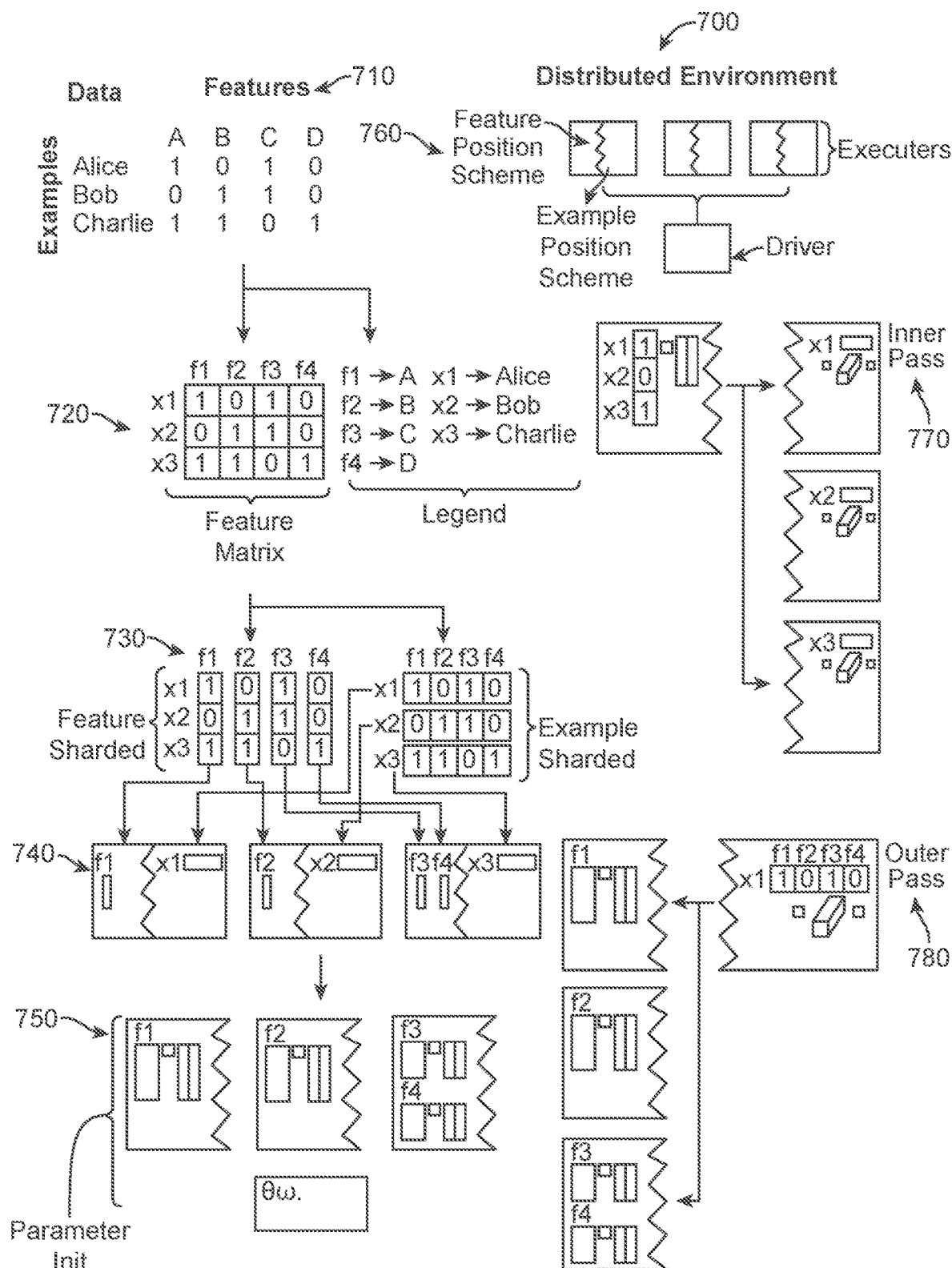
FIG. 7 is a schematic diagram of a technique for predicting values in a matrix, in accordance with some embodiments.

FIG. 7 is a schematic diagram of a technique 700 for predicting values in a matrix.

Block 710 shows a matrix with feature columns (e.g., representing businesses A, B, C, and D) and example rows (e.g., representing individuals Alice, Bob, and Charlie). A "1" (or other non-zero value) in the matrix represents that the individual currently works or has previously worked at the business (e.g., Alice currently works or has previously worked at A). A "0" in the matrix represents that the individual does not work and has never worked at the business (e.g., Bob does not work and has never worked at D). As shown, the y-axis of the matrix in block 710 represents people—Alice, Bob, and Charlie. However, each row is a data point and does not necessarily correspond to a person. In some cases, a single person may correspond to multiple examples. In some cases, multiple people may correspond to a single example.

Block 720 shows the matrix with the names of the individuals and businesses mapped to integers and represented by a legend. At block 730, the features are divided into feature shards (f1 through f4), and the examples are divided into example shards (x1 through x3).

At block 740, the shards are provided to machines (e.g., computation servers 120). Each machine has an inner component for the feature shards, and an outer component for example shards. Blocks 730 and 740 may together sketch out a sharding scheme—partitioning in block 730 and distribution in block 740.

At block 750, the inner component of each machine is separated from the outer component, and parameters are initialized. Initializing the parameters ma entail allocating vectors (at least one) per feature in each shard at each machine. Some aspects generally allocate vectors of some dimension between 16 to 1024 and assign random values to each factor, based on a normal distribution.

At block 760, a distributed environment is used. A feature partition scheme and an example partition scheme are provided, by executors, to the control server 110. Features are partitioned by the feature partition scheme. Examples are partitioned by the example partition scheme. The control server 110 may perform the operations of blocks 720 and 730, and may distribute the shards to the machines at block 740. Some aspects minimize the amount of data movement and coordination between each individual machine of the machines to which the shards are provided at block 740.

At block 770, the machines run an inner pass to generate a first correlation, the first correlation correlating data in an inner component of at least a first machine with data in the outer components of the plurality of machines.

At block 780, the machines run an outer pass to generate a second correlation, the second correlation correlating data in an outer component of at least a second machine with data in the inner components of the plurality of machines. The first correlation and the second correlation may be stored, for example, at the control server 110. An output representing at least the first correlation and the second correlation may be provided. As used herein, the phrases "inner pass" and "outer pass" may refer to making a prediction based on current learned parameters (e.g. factor values) and comparing to the label to compute an error. The error signal is propagated to improve the parameters. Using the inner pass and outer pass, some aspects provide implementation level techniques for scaling machine learning problems.

Figure 8:
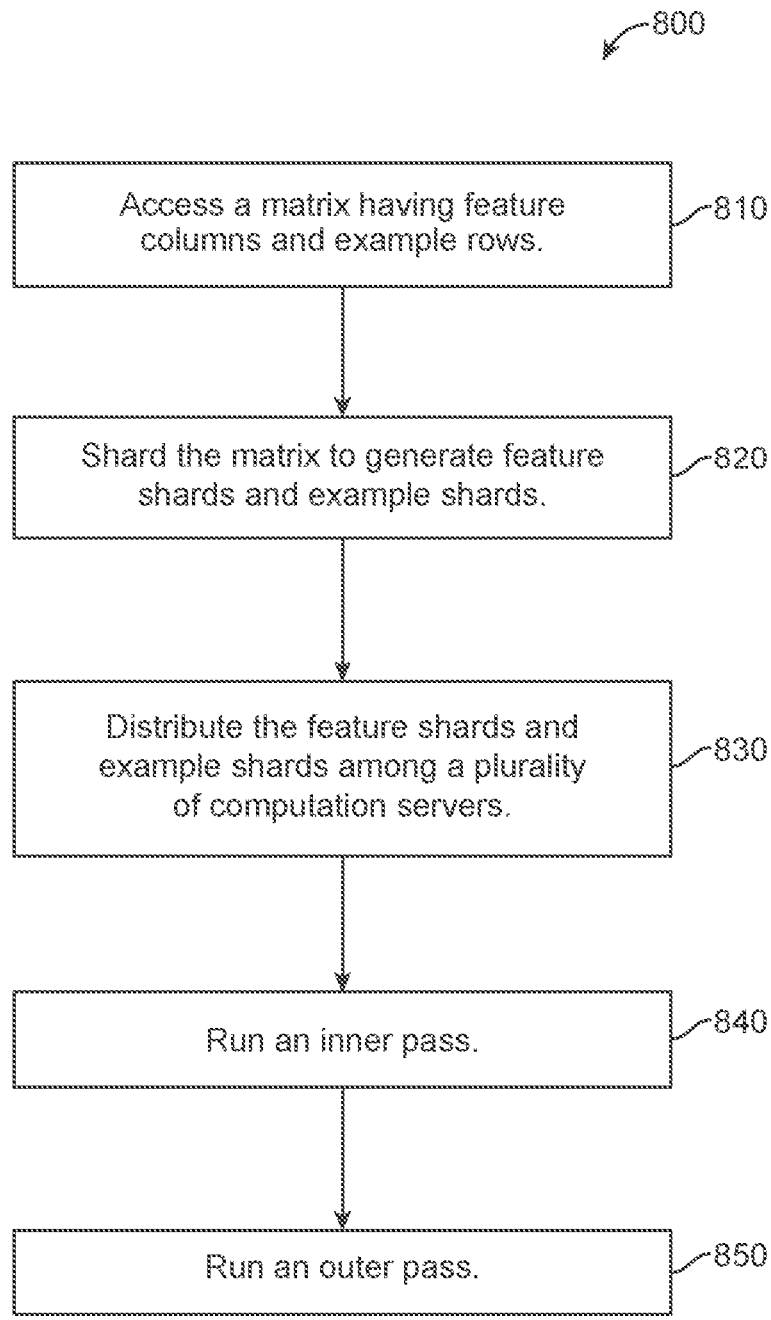
FIG. 8 is a flow chart of a method for training a machine and predicting values in a matrix, in accordance with some embodiments.

FIG. 8 is a flow chart of a method 800 for training a machine and predicting values in a matrix. The method 800 is described here as being implemented within the system 100 of FIG. 1. However, the method 800 may also be implemented using other machines in other systems.

At operation 810, the control server 110 accesses a matrix. The matrix has feature columns and example rows. In some embodiments, the feature represent businesses and the examples represent individuals/entities. A non-zero value in the matrix associated with a first individual and a first business indicates that the first individual is or has been employed at the first business. A zero value in the matrix associated with a second individual and a second business indicates that the second individual is not and has not been employed at the second business.

At operation 820, the control server 110 shards the matrix by features and by examples to generate feature shards and example shards, respectively. Each feature shard includes at least one feature column, and each example shard includes at least one example row. In some cases, each of the feature shards has the same number of feature columns, and each of the example shards has the same number of example columns. The number of feature shards may be equal to the number of feature columns in the matrix divided by the number of computation servers 120. The number of example shards may be equal to the number of example rows in the matrix divided by the number of computation servers 120. The operation 820 may correspond to the block 730.

At operation 830, the control server 110 distributes the feature shards and the example shards among the plurality of computation servers 120. Each computation server 120.$k$ includes an inner component storing at least one feature shard and an outer component storing at least one example shard. The operation 830 may correspond to the block 740.

At operation 840, the computation servers 120 run an inner pass to generate a first correlation. The first correlation correlates data in an inner component of at least a first computation server 120.1 with data in the outer components of the plurality of computation servers 120. The operation 840 may correspond to the block 770.

At operation 850, the computation servers run outer pass to generate a second correlation. The second correlation correlates data in an outer component of at least a second computation server 120.2 with data in the inner components of the plurality of computation servers 120. After the inner pass and outer pass are completed, the first correlation and the second correlation may be stored at the control server 110. The control server 110 may provide an output associated with at least the first correlation and the second correlation. The operation 850 may correspond to the block 780. In some implementations, the operations 840 and 850 are done multiple times in the training phase. In some cases, the operations 810-840 may correspond to the operations of FIG. 5, with parts of the operation 850 including an additional step of computing error and learning.

In some implementations, the control server 110 receives a new example row for the matrix. To generate a recommendation, the control server 110 predicts, based on the first correlation or the second correlation, that at least one zero value in the new example row should be non-zero. In some cases, the zero value(s) that should be non-zero are associated with a specific feature. The recommendation output provided by the control server 110 may include an indication that an individual associated with the new example row should work at a business associated with the specific feature. In other words, the individual may be a good fit for an employment position at the business.

Figure 9:
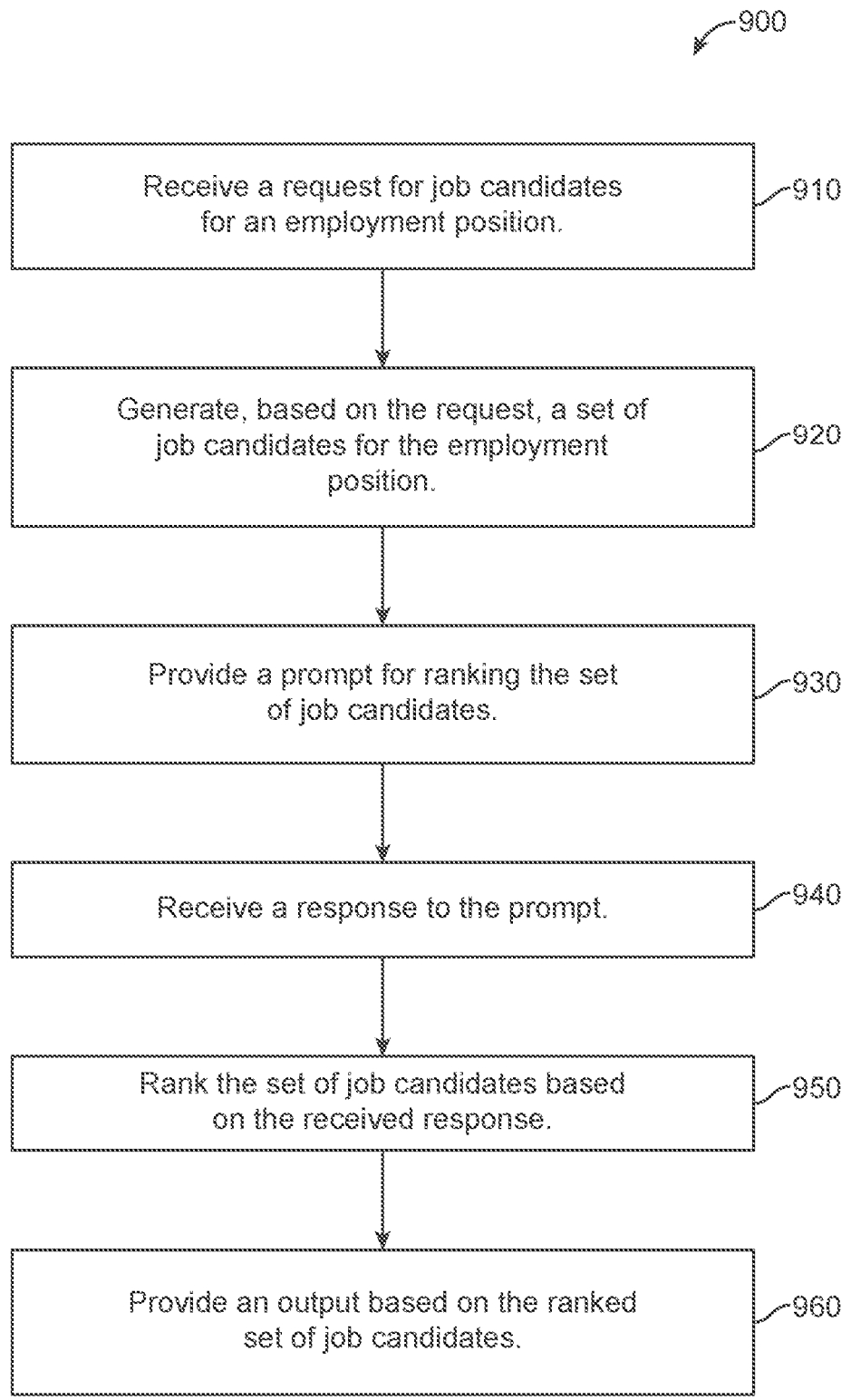
FIG. 9 is a flow chart, of a method for ranking job candidates, in accordance with some embodiments.

FIG. 9 is a flow chart of a method 900 for ranking job candidates, for example, to generate a recommendation of a job candidate for a specified employment position. As described here, the method 900 may be implemented at the control server 110 of the system 100. Alternatively, the method 900 may be implemented at other machine(s) or in other system(s).

At operation 910, the control server 110 receives, from the client device 130, a request for job candidates for an employment position. The request includes criteria. For example, a request may specify a software engineer in the San Francisco Bay Area with at least a Master's Degree and at least five years of experience. The client device 130 may be operated by a recruiter or headhunter.

At operation 920, the control server 110 generates, based on the request, a set of job candidates for the employment position. For example, the control server may access a data repository (e.g., a professional networking service or an applicant tracking system) and obtain job candidates by filtering job candidates that meet the criteria from the data repository. In some cases, the set of job candidates are generated based on the criteria in the request and based on additional criteria. The additional criteria are determined based on stored information associated with a user of the client device 130. The stored information may include, for example, a company for which the user recruits and whether the user is an employee of that company or an employee, contractor or worker of a staffing agency. The stored information may include whether the user is a recruiter or a non-recruiting professional, an industry associated with the user, and a current employer of the user.

At operation 930, the control server 110 provides, to the client device 130, a prompt for ranking the set of job candidates. At operation 940, the control server 110 receives, from the client device 130, a response to the prompt. At operation 950, the control server 110 ranks the set of job candidates based on the received response. The operations 930 and 940 relate to refinement. The user of the client device is asked some intelligent questions, which may be based on the FFM model. These questions may be generated in conjunction with the operation 920. The ranking of operation 950 is based on multiple factors, including the answers to the refinement questions from operations 930 and 940.

In some implementations, the prompt includes a request to identify an account of an individual meeting the search criteria for the employment position. The ranking of the set of job candidates is based on one or more attributes of the identified account. The attributes may include one or more of skills, titles, industries, current and past employers, current and past educational institutions, degrees obtained, areas of study, job function, years of experience, and businesses interacted with in a professional networking service.

In some implementations, the prompt includes a request for a user of the client device 130 to select a prior employer from a set of prior employers. For example, the user may be asked if he/she prefers a job candidate who previously worked at ABC Corporation, DEF Corporation, or GHI Corporation. The ranking of the set of job candidates is based on the prior employer selected by the user of the client device. For example, if ABC Corporation is selected, then job candidates who have worked at ABC Corporation or similar companies are ranked higher than job candidates who have worked at DEF Corporation (and similar companies) or GHI Corporation (and similar companies). In some cases, the control server 110 computes, for each employer in a set of employers, a similarity score to the prior employer selected by the user of the client device (e.g., a similarity score to ABC Corporation). The similarity score is computed based on a number (e.g., in a professional networking service or other data repository) of current or former employees of the employer, a number of employees of the prior employer, and a number of common current or former employees of the employer and the prior employer. Ranking the set of job candidates based on the prior employer includes removing, from the set of job candidates, at least one job candidate who lacks a prior employer having at least a threshold similarity score.

In some implementations, the similarity score is computed using machine learning. The machine learning takes into account weighted employment histories and a current employer of a first set of individuals. The machine learning further takes into account negative sampling of weighted employment histories of a second set of individuals. Each individual in the second set of individuals corresponds to a real individual's past employment history, but is assigned a fictitious current employer for the negative sampling. Negative sampling is discussed in more detail in conjunction with FIGS. 10-11, below.

In some implementations, the prompt includes a request for a user of the client device 130 to select an area of expertise from a set of areas of expertise. The ranking of the set of job candidates is based on the area of expertise selected by the user of the client device 130.

At operation 960, the control server 110 provides, for display at the client device 130, an output based on the ranked set of job candidates. For example, the output may include all of the job candidates in the set having a ranking that exceeds a threshold ranking value. In some cases, the N highest-ranked job candidates in the set are displayed, where N is a positive integer, for example, 5, 1.0, or 20.

In some cases, the control server 110 (or another machine) determines, for at least one job candidate from the set of job candidates, one or more areas of expertise based on one or more identified skills of the job candidate. Techniques for determining areas of expertise are described in conjunction with FIG. 6. The identified skill(s) may correspond to the title provided in block 620.

Machine learning may be used to predict data that can exist in the real world. Machine learning typically relies on providing positive true samples and negative false samples, and teaching the machine to distinguish between the positive and negative samples. Positive real-world data is relatively easy to obtain. (E.g., in a machine learning algorithm that uses an individual's history of employers to predict a current employer, positive samples can be obtained from publicly shared data in a professional networking service.) However, obtaining negative samples (e.g., samples of individuals who did not work at a company or individuals who were rejected by the company) may be challenging. Some aspects of the technology described herein address this challenge. Some aspects of the sampling technique described herein make up negative examples. Some of the negative examples may be incorrect (e.g., if an individual received an offer from a company, but did not join, or if an individual worked at a company, but this is not indicated in the data available about the individual). However, the exploited characteristic is likely to be correct since the vast majority of people cannot or could not work at a random employment position from the entire set of possibilities.

Figure 10:
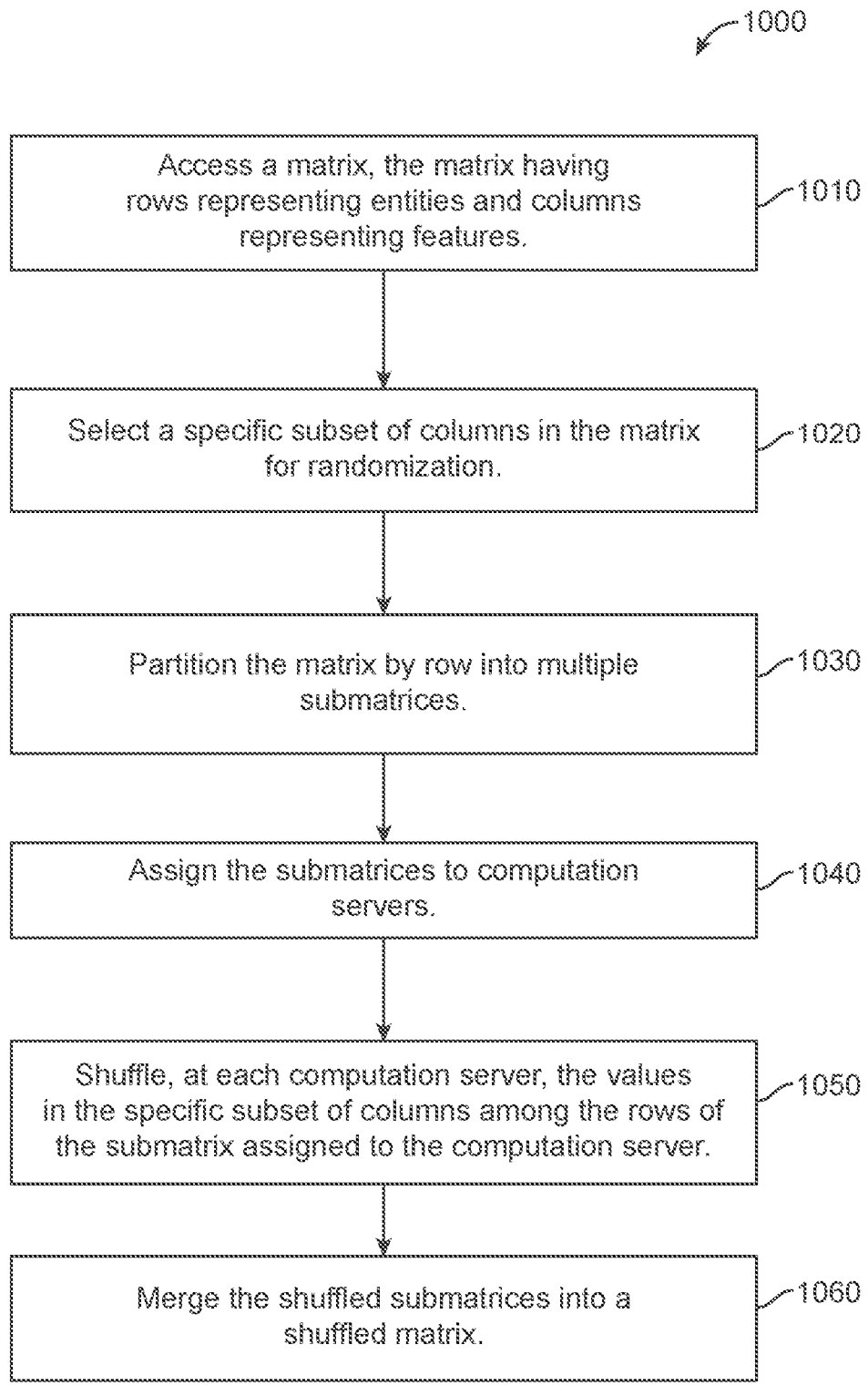
FIG. 10 is a flow chart of a method for negative sampling, in accordance with some embodiments.

FIG. 10 is a flow chart of a method 1000 for negative sampling. As described here, the method 1000 is implemented within the system 100 of FIG. 1. However, the method 1000 may be implemented at other machine(s) or in other system(s).

At operation 1010, the control server 110 accesses (e.g., from a data repository) a matrix. The matrix has rows representing entities (e.g., individuals) and columns representing features (e.g., employers). An example matrix is described in conjunction with FIG. 11. The accessed matrix may be generate based on data stored in a professional networking service.

At operation 1020, the control server 110 selects a specific subset of columns (which may include at least one column) in the matrix for randomization. The subset of columns may include, for example, a column that represents a current employer of the employee (in other words, a current feature of the entity or other specified feature of the entity). In some implementations, the entities are employees, and the features are current employers and former employers of the employees, and the specific column is associated with the current employers. In some implementations, the entities are high school (or other) students, the features are high school grades in a plurality of subjects, scores on a plurality of exams, and higher education institution (e.g. college) attended, and the specific column is associated with the higher education institution attended.

At operation 1030, the control server 1010 partitions the example matrix by example row into multiple submatrices.

At operation 1040, the control server 1010 assigns the multiple submatrices to multiple computation servers 120. In some implementations, each submatrix is assigned to one computation server 120.k.

At operation 1050, each computation server 120.k shuffles the values in each column in the specific subset of columns among the rows of the submatrix assigned to the computation server 120.k. In some cases, the computation servers 120 shuffle the values in the specific column in parallel. The computation servers 120 provide the shuffled submatrices to the control server 110.

At operation 1060, the control server 110 merges the shuffled submatrices into a shuffled matrix. The control server provides an output representing the shuffled matrix. It should be noted that the original accessed matrix may represent real world data, and the shuffled matrix may represent fictitious negative sampling data. In some cases, output representing the shuffled matrix is provided to a machine implementing a machine learning training algorithm for predicting values in the specific column. The shuffled matrix is used for negative examples for the machine learning training algorithm, and the accessed matrix is used for positive examples for the machine learning training algorithm.

FIG. 11 is schematic diagram 1100 of matrices that may be used in negative sampling. As shown, the diagram 1100 includes four matrices 1110, 1120, 1130, and 1140. Matrices 1110 and 1120 represent real world data and may be generated, for example, from publicly accessible data in a professional networking service. Matrices 1130 and 1140 represent fictitious negatively sampled data and may be generated, for example, using the negative sampling techniques described herein. As shown in the matrices of the diagram 1100, each row represents a person. However, in some cases, a person ma be represented in multiple rows or multiple people may be represented in a single row.

Matrix 1110 has rows representing four data points, which are extracted from four individuals—Albert, Betsy, Carlos, and Diana—and columns representing eight corporations—A, B, C, D, E, F, and H. The values represent a weighted past employment history of the individuals, where the most recent past employer has twice the weight of the second most recent, which has twice the weight of the third most recent, etc. The sum of the weights for each individual is 1.

For example, Albert's most recent past employer is E. Before E, Albert was employed at C, and before C, Albert was employed at A. Thus, the weight for the Albert-E cell (4/7) is twice that for the Albert-C cell (2/7), which is twice that for the Albert-A cell (1/7). The weights for the other corporations—B, D, F, G, and H, are blank or zero because they are not Albert's past employers. It should be noted that the sum of all of the weights for Albert is 1.

Betsy's most recent past employer is D, and before that Betsy was employed at B. Thus, Betsy's weight for D (2/3) is twice that for B (1/3). Betsy's weights for the other corporations is blank or zero because they are not Betsy's past employers. It should be noted that the sum of all of the weights for Betsy is 1.

Carlos' most recent past employer is D. Before D, Carlos was employed at C, and before C, Carlos was employed at B. Thus, the weight for the Carlos-D cell (4/7) is twice that for the Carlos-C cell (2/7), which is twice that for the Carlos-B cell (1/7). The weights for the other corporations—A, E, F, G, and H, are blank or zero because they are not Carlos' past employers. It should be noted that the sum of all of the weights for Carlos is 1.

Diana's most recent past employer is E, and before that Betsy was employed at A. Thus, Diana's weight for F (2/3) is twice that for A (1/3). Diana's weights for the other corporations is blank or zero because they are not Diana's past employers. It should be noted that the sum of all of the weights for Diana is 1.

Matrix 1120 has the same rows (Albert, Betsy, Carlos, and Diana) and columns (A, B, C, D, E, F, G, and H) as matrix. 1110. Matrix 1111 has a 1 in the cell representing the current employer of each individual, and a blank/0 in other cells in the individual's row. As shown, Albert's current employer is D, Betsy's current employer is F, Carlos' current employer is G, and Diana's current employer is H.

Matrices 1130 and 1140 represent fictitious negatively sampled data and may be generated, for example, using the negative sampling techniques described herein. As shown, the cells of matrix 1130 have the same values as those of matrix 1110. However, the individuals are labeled "Fictitious Albert," "Fictitious Betsy," "Fictitious Carlos," and "Fictitious Diana," in place of "Albert," "Betsy," "Carlos," and "Diana." in matrix 1140, the rows of the matrix 1120 are scrambled, such that the first row (representing Albert) of matrix 1120 becomes the fourth row (representing fictitious Diana) in matrix 1140, the second row (representing Betsy) of matrix 1120 becomes the third row (representing fictitious Carlos) in matrix 1140, the third row (representing Carlos) of matrix 1120 becomes the first row (representing fictitious Albert) in matrix 1140, and the fourth row (representing Diana) of matrix 1120 becomes the second row (representing fictitious Betsy) in matrix 1140. As a result, matrix 1140 indicates that fictitious Albert's current employer is G Corp., fictitious Betsy's current employer is H Corp., fictitious Carlos' current employer is F Corp., and fictitious Diana's current employer is D Corp. These are different from the real world current employers of matrix 1120.

As a result of the schematic diagram 1100, a machine learning algorithm that tries to predict, for an individual, a current employer based on the individual's past employers, may have real world positive samples and fictitious negative samples. In a scenario where there are thousands of employers only a few of which are a good fit for an employee, negative sampling by randomly selecting a business to replace the "current employer" field may result in provision of multiple negative samples for training the machine learning algorithm.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It may be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-10 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture may create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and
Machine-Readable Medium

Figure 12:
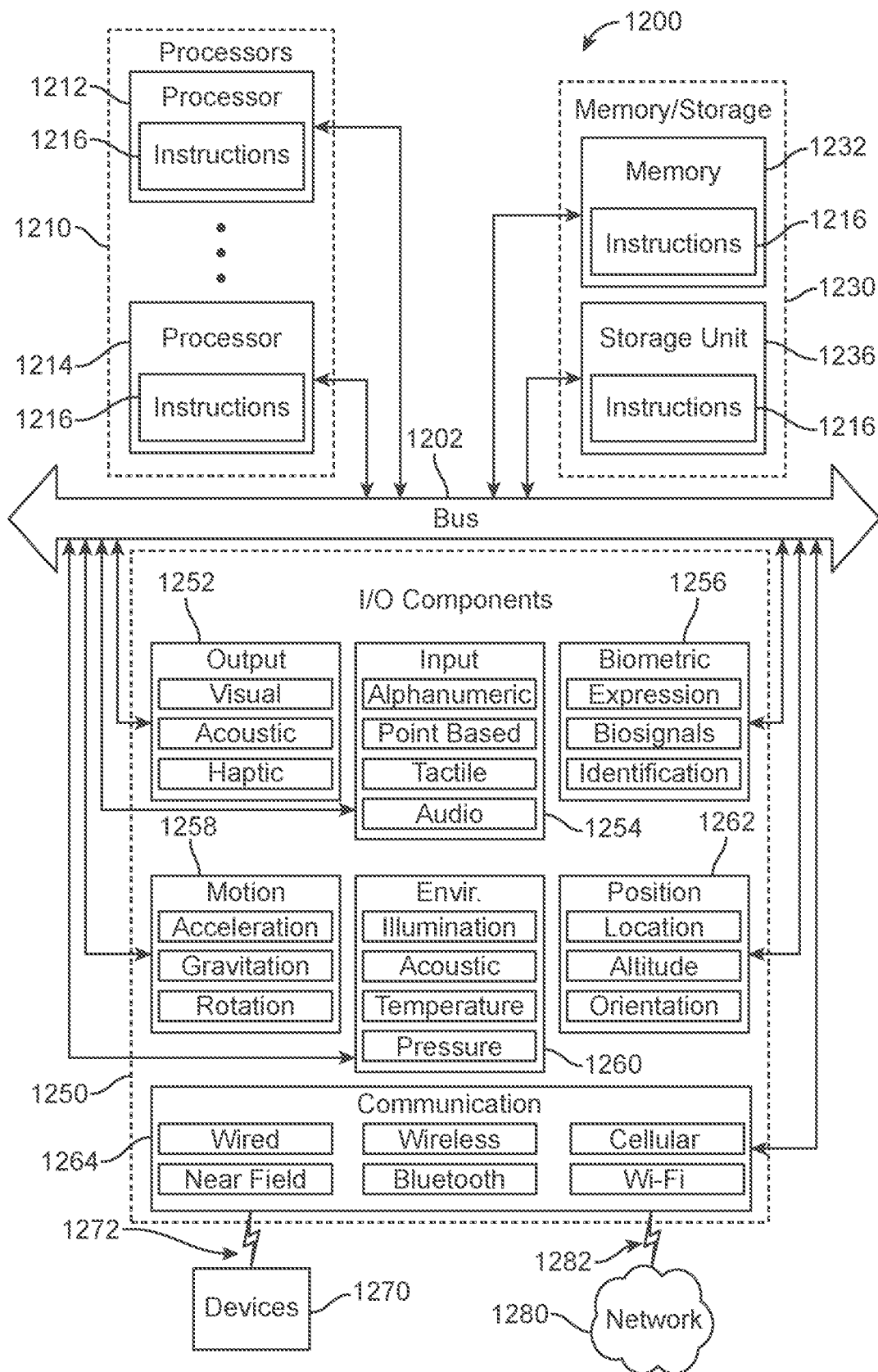
FIG. 12 is a block diagram illustrating components of a machine able to read instructions from a machine-readable medium and perform any of the methodologies discussed herein, in accordance with some embodiments.

FIG. 12 is a block diagram illustrating components of a machine 1200, according to some example embodiments, able to read instructions from a machine-readable medium (e.g., a machine-readable storage medium and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. The instructions 1216 transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a serves-client network environment, or as a peer machine in a peer-to-peer (or distributed) network environment. The machine 1200 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an ASIC, a Radio-Frequency integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions (e.g., instructions 1216) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine may depend on the type of machine. For example, portable machines such as mobile phones may likely include a touch input device or other such input mechanisms, while a headless server machine may likely not include such a touch input device. It is appreciated that the components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency identification (RFID) tag reader components, NEC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter ma be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, from a client device, a request for job candidates for an employment position, the request comprising search criteria;
   generating a set of job candidates for the employment position by searching a data repository based on at least the search criteria;
   providing, to the client device, a prompt for ranking the set of job candidates;
   receiving, from the client device, a response to the prompt;
   ranking, using a machine learning engine, the set of job candidates based on the received response, wherein the machine learning engine is trained using a training dataset generated from records in the data repository, the training dataset comprising positive samples and negative samples, wherein at least one positive sample comprises a current employer indicated in a record used to generate the positive sample and past employers indicated in the record used to generate the positive sample, wherein at least one negative sample comprises a current employer from a record different from a record used to generate the negative sample and past employers indicated in the record used to generate the negative sample; and
   providing, for display at the client device, an output based on the ranked set of job candidates.

2. The method of claim 1, wherein the prompt comprises a request to identify an account of an individual meeting the search criteria for the employment position, and wherein ranking the set of job candidates comprises ranking the set of job candidates based on one or more attributes of the identified account, the attributes comprising one or more of skills, titles, industries, current and past employers, current and past educational institutions, degrees obtained, areas of study, job function, years of experience, and businesses interacted with in a professional networking service.

3. The method of claim 1, wherein the prompt comprises a request for a user of the client device to select a prior employer from a set of prior employers, and wherein ranking the set of job candidates comprises ranking the set of job candidates based on the prior employer selected by the user of the client device.

4. The method of claim 3, further comprising:
   computing, for each employer in a set of employers, a similarity score to the prior employer selected by the user of the client device, the similarity score being computed based on a number of current or former employees of the employer, a number of employees of the prior employer, and a number of common current or former employees of the employer and the prior employer,
   wherein ranking the set of job candidates based on the prior employer comprises: removing, from the set of job candidates, at least one job candidate who lacks a prior employer having at least a threshold similarity score.

5. The method of claim 4, wherein the similarity score is computed using machine learning, the machine learning taking into account weighted employment histories and a current employer of a first set of individuals, the machine learning further taking into account negative sampling of weighted employment histories of a second set of individuals, the second set of individuals being assigned a fictitious current employer for the negative sampling.

6. The method of claim 1, wherein the prompt comprises a request for a user of the client device to select an area of expertise from a set of areas of expertise, and wherein ranking the set of job candidates comprises ranking the set of job candidates based on the area of expertise selected by the user of the client device.

7. The method of claim 1, further comprising:
   determining, for at least one job candidate from the set of job candidates, one or more areas of expertise based on one or more identified skills of the at least one job candidate.

8. The method of claim 1, wherein the set of job candidates are generated based on the search criteria in the request and based on additional search criteria, the additional search criteria being determined based on stored information associated with a user of the client device.

9. The method of claim 8, wherein the stored information comprises whether the user is a recruiter or a non-recruiting professional, an industry associated with the user, and a current employer of the user.

10. A non-transitory computer-readable medium storing instructions which, when implemented by processing circuitry of one or more computers, cause the processing circuitry to perform operations comprising:
    receiving, from a client device, a request for job candidates for an employment position, the request comprising search criteria;
    generating a set of job candidates for the employment position by searching a data repository based on at least the search criteria;
    providing, to the client device, a prompt for ranking the set of job candidates;
    receiving, from the client device, a response to the prompt;
    ranking, using a machine learning engine, the set of job candidates based on the received response, wherein the machine learning engine is trained using a training dataset generated from records in the data repository, the training dataset comprising positive samples and negative samples, wherein at least one positive sample comprises a current employer indicated in a record used to generate the positive sample and past employers indicated in the record used to generate the positive sample, wherein at least one negative sample comprises a current employer from a record different from a record used to generate the negative sample and past employers indicated in the record used to generate the negative sample; and providing, for display at the client device, an output based on the ranked set of job candidates.

11. The computer-readable medium of claim 10, wherein the prompt comprises a request to identify an account of an individual meeting the search criteria for the employment position, and wherein ranking the set of job candidates comprises ranking the set of job candidates based on one or more attributes of the identified account, the attributes comprising one or more of skills, titles, industries, current and past employers, current and past educational institutions, degrees obtained, areas of study, job function, years of experience, and businesses interacted with in a professional networking service.

12. The computer-readable medium of claim 10, wherein the prompt comprises a request for a user of the client device to select a prior employer from a set of prior employers, and wherein ranking the set of job candidates comprises ranking the set of job candidates based on the prior employer selected by the user of the client device.

13. The computer-readable medium of claim 12, further comprising:

computing, for each employer in a set of employers, a similarity score to the prior employer selected by the user of the client device, the similarity score being computed based on a number of current or former employees of the employer, a number of employees of the prior employer, and a number of common current or former employees of the employer and the prior employer, wherein ranking the set of job candidates based on the prior employer comprises: removing, from the set of job candidates, at least one job candidate who lacks a prior employer having at least a threshold similarity score.

14. The computer-readable medium of claim 13, wherein the similarity score is computed using machine learning, the machine learning taking into account weighted employment histories and a current employer of a first set of individuals, the machine learning further taking into account negative sampling of weighted employment histories of a second set of individuals, the second set of individuals being assigned a fictitious current employer for the negative sampling.

15. The computer-readable medium of claim 10, wherein the prompt comprises a request for a user of the client device to select an area of expertise from a set of areas of expertise, and wherein ranking the set of job candidates comprises ranking the set of job candidates based on the area of expertise selected by the user of the client device.

16. The computer-readable medium of claim 10, further comprising:

determining, for at least one job candidate from the set of job candidates, one or more areas of expertise based on one or more identified skills of the at least one job candidate.

17. The computer-readable medium of claim 10, wherein the set of job candidates are generated based on the search criteria in the request and based on additional search criteria, the additional search criteria being determined based on stored information associated with a user of the client device.

18. The computer-readable medium of claim 17, wherein the stored information comprises whether the user is a recruiter or a non-recruiting professional, an industry associated with the user, and a current employer of the user.

19. A system comprising:

processing circuitry; and a memory storing instructions which, when implemented by the processing circuitry, cause the processing circuitry to perform operations comprising:

receiving, from a client device, a request for job candidates for an employment position, the request comprising search criteria;

generating a set of job candidates for the employment position by searching a data repository based on at least the search criteria;

providing, to the client device, a prompt for ranking the set of job candidates;

receiving, from the client device, a response to the prompt;

ranking, using a machine learning engine, the set of job candidates based on the received response, wherein the machine learning engine is trained using a training dataset generated from records in the data repository, the training dataset comprising positive samples and negative samples, wherein at least one positive sample comprises a current employer indicated in a record used to generate the positive sample and past employers indicated in the record used to generate the positive sample, wherein at least one negative sample comprises a current employer from a record different from a record used to generate the negative sample and past employers indicated in the record used to generate the negative sample; and providing, for display at the client device, an output based on the ranked set of job candidates.

20. The system of claim 19, wherein the prompt comprises a request to identify an account of an individual meeting the search criteria for the employment position, and wherein ranking the set of job candidates comprises ranking the set of job candidates based on one or more attributes of the identified account, the attributes comprising one or more of skills, titles, industries, current and past employers, current and past educational institutions, degrees obtained, areas of study, job function, years of experience, and businesses interacted with in a professional networking service.

* * * * *